(12) United States Patent
Tsukagoshi et al.

(10) Patent No.: US 10,511,882 B2
(45) Date of Patent: Dec. 17, 2019

(54) RECEPTION APPARATUS, RECEPTION METHOD, AND TRANSMISSION APPARATUS

(71) Applicant: SONY CORPORATION, Tokyo (JP)

(72) Inventors: Ikuo Tsukagoshi, Tokyo (JP); Kazuhiko Takabayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/070,815

(22) PCT Filed: Jan. 17, 2017

(86) PCT No.: PCT/JP2017/001438
§ 371 (c)(1),
(2) Date: Jul. 18, 2018

(87) PCT Pub. No.: WO2017/130804
PCT Pub. Date: Aug. 3, 2017

(65) Prior Publication Data
US 2019/0028757 A1    Jan. 24, 2019

(30) Foreign Application Priority Data

Jan. 26, 2016  (JP) ................................. 2016-012856

(51) Int. Cl.
*H04N 21/431* (2011.01)
*H04N 21/435* (2011.01)
(Continued)

(52) U.S. Cl.
CPC ......... *H04N 21/431* (2013.01); *H04N 7/0885* (2013.01); *H04N 21/4355* (2013.01)

(58) Field of Classification Search
CPC ............... H04N 21/431; H04N 21/435; H04N 21/2358; H04N 21/4355; H04N 21/4884;
(Continued)

(56) References Cited

U.S. PATENT DOCUMENTS 5,912,710 A * 6/1999 Fujimoto ............... G09G 5/02
348/445
6,297,797 B1 * 10/2001 Takeuchi ............ G09G 5/393
345/467
(Continued)

FOREIGN PATENT DOCUMENTS

EP      2 675 174 A1    12/2013
JP      3090704 U       12/2002
JP      2012-169885 A    9/2012

OTHER PUBLICATIONS

Extended European Search Report dated Nov. 22, 2018 in corresponding European Patent Application No. 17744034.4, 10 pages.
(Continued)

*Primary Examiner* — Jefferey F Harold
*Assistant Examiner* — Mustafizur Rahman
(74) *Attorney, Agent, or Firm* — Oblon, McClelland, Maier & Neustadt, L.L.P

(57) ABSTRACT

An object is to make it possible to perform caption display satisfactorily in a case where the caption display position is designated as a relative position.

The video stream is decoded to obtain video data, and the subtitle stream including the caption information is decoded to obtain bitmap data of the caption. The caption display position in the caption display position information included in the caption information is designated as a relative position with respect to the caption display range. In a case where the aspect ratio of the video area is different from the aspect ratio of the display video area, the caption display position is determined with the display video area defined as the caption display range, further resize processing is performed, and the display position control is performed onto the bitmap data of the caption on the basis of the caption display position that has undergone the resize processing.

(Continued)

Bitmap data of the caption that has undergone display position control is superimposed on the video data to obtain display video data.

14 Claims, 19 Drawing Sheets

(51) Int. Cl.
*H04N 9/82* (2006.01)
*H04N 21/235* (2011.01)
*H04N 21/488* (2011.01)
*H04N 7/088* (2006.01)

(58) Field of Classification Search
CPC ... H04N 7/0885; H04N 9/8205; H04N 9/8233
USPC ....... 348/461, 445, 564, 556, 569, 581, 584, 348/589, 239, 43, 706, 719, 725; 386/244, 246
See application file for complete search history.

(56) References Cited

U.S. PATENT DOCUMENTS

| | | | |
|---|---|---|---|
| 7,009,650 B2* | 3/2006 | Kashio | G06T 3/40 345/660 |
| 2002/0126142 A1* | 9/2002 | Hodgkinson | H04N 5/445 715/719 |
| 2003/0189669 A1* | 10/2003 | Bowser | H04N 5/445 348/564 |
| 2005/0078948 A1* | 4/2005 | Yoo | G11B 20/1217 386/241 |
| 2005/0160468 A1* | 7/2005 | Rodriguez | G06F 3/14 725/109 |
| 2005/0196147 A1* | 9/2005 | Seo | G11B 27/105 386/243 |
| 2006/0088291 A1 | 4/2006 | Wang | |
| 2007/0052851 A1* | 3/2007 | Ochs | H04N 5/44513 348/556 |
| 2009/0027552 A1* | 1/2009 | Yang | G11B 27/034 348/465 |
| 2009/0207305 A1* | 8/2009 | Fujita | H04N 7/163 348/468 |
| 2011/0033170 A1* | 2/2011 | Ikeda | G11B 27/034 386/244 |
| 2011/0128351 A1* | 6/2011 | Newton | H04N 5/278 348/43 |
| 2013/0010062 A1* | 1/2013 | Redmann | H04N 5/278 348/43 |
| 2014/0063187 A1 | 3/2014 | Tsukagoshi | |
| 2015/0006662 A1* | 1/2015 | Braness | H04L 65/607 709/213 |

OTHER PUBLICATIONS

International Search Report dated Apr. 18, 2017 in PCT/JP2017/001438, 1 page.

* cited by examiner

FIG. 2
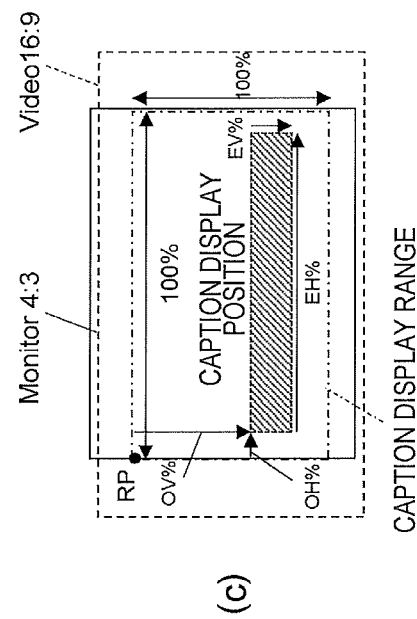
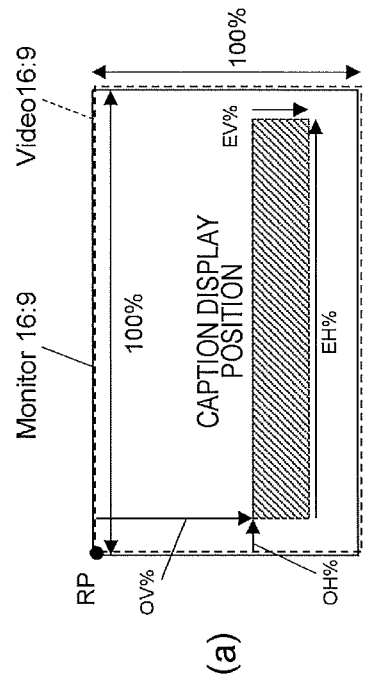
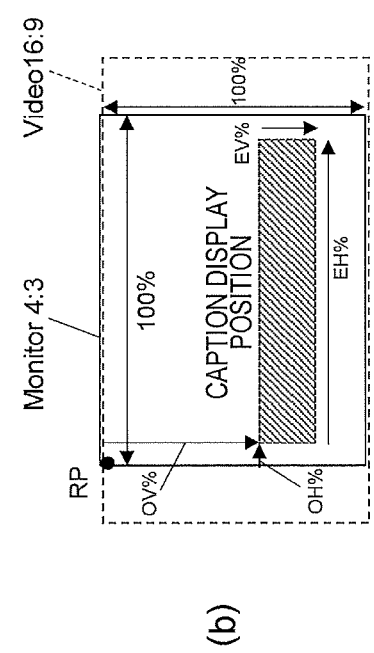

FIG. 3

```
<tt xml:lang=" " xmlns="http://www.w3.org/ns/ttml"
  tts:extent=fullvideo
  xmlns:ttp="http://www.w3.org/ns/ttml#parameter"
  xmlns:tts="http://www.w3.org/ns/ttml#styling"
  xmlns:dto="http://www.example.org/ns/displaytextoverlay"
  dto:dispasp="16:9"
  dto:RPoffset="Ax%, By%">
  <head>
    <layout>
      <region xml:id="r1" tts:origin="OH% OV%" tts:extent="EH% EV%"/>
    </layout>
  </head>
  <body>
    <p xml:id="p1" region="r1"
   dto:scalingjustify=top
   > ABCDE</p>
  </body>
</tt>
```

FIG. 4

| | |
|---|---|
| dto:dispasp | |
| "4:3" | : CAPTION DISPLAY RANGE IS AREA OF ASPECT RATIO 4:3 |
| "16:9" | : CAPTION DISPLAY RANGE IS AREA OF ASPECT RATIO 16:9 |
| "21:9" | : CAPTION DISPLAY RANGE IS AREA OF ASPECT RATIO 21:9 |
| | |
| dto:RPoffset="Ax%, By%" | |
| Ax, By | RP POSITION WHEN VERTICAL/HORIZONTAL IN DISPLAY VIDEO AREA IS EACH 100% IS INDICATED BY OFFSET RATIO FROM op-left OF DISPLAY VIDEO AREA. |
| | |
| dto:scalingjustify | |
| "bottom" | : bottomline-justified |
| "middle" | : middleline-justified |
| "top" | : topline-justified |

FIG. 5

```
<tt xml:lang=" " xmlns="http://www.w3.org/ns/ttml"
  tts:extent=fullvideo
  xmlns:ttp="http://www.w3.org/ns/ttml#parameter"
  xmlns:tts="http://www.w3.org/ns/ttml#styling"
  xmlns:dto="http://www.example.org/ns/displaytextoverlay"
  dto:dispasp="16:9"
  dto:RPoffset="Ax%, By%">
  <head>
    <layout>
      <region xml:id="r1" tts:origin="OH1% OV1%" tts:extent="EH1% EV1%"/>
      <region xml:id="r2" tts:origin="OH2% OV2%" tts:extent="EH2% EV2%"/>
    </layout>
  </head>
  <body>
    <p xml:id="p1" region="r1"
      dto:scalingjustify=bottom
    > ABCDE</p>
    <p xml:id="p2" region="r2"
      dto:scalingjustify=top
    > FGH</p>
  </body>
</tt>
```

FIG. 6

16:9 video on 16:9 monitor

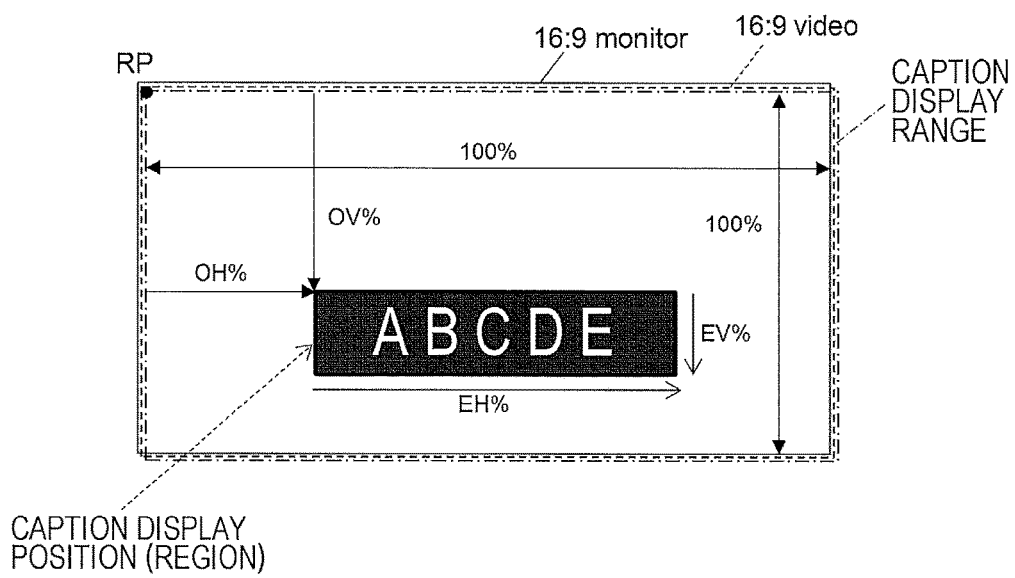

16:9 video on 16:9 monitor

16:9 video on 4:3 monitor

16:9 video on 4:3 monitor

16:9 video on 4:3 monitor

FIG. 18
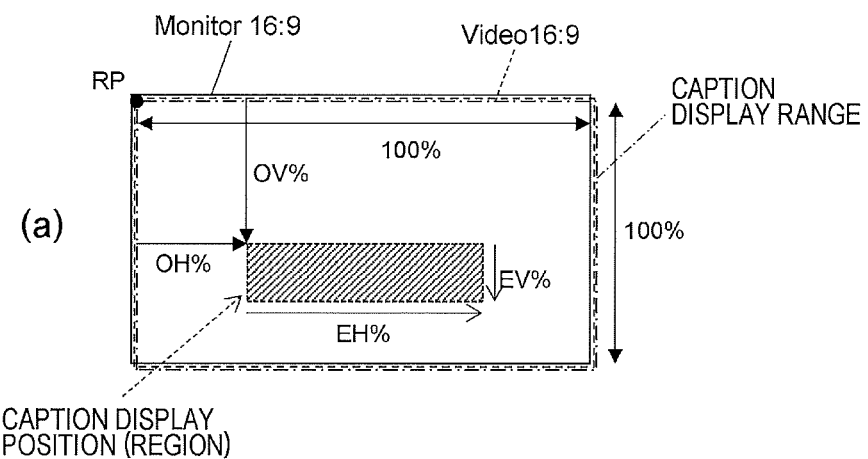
(a)
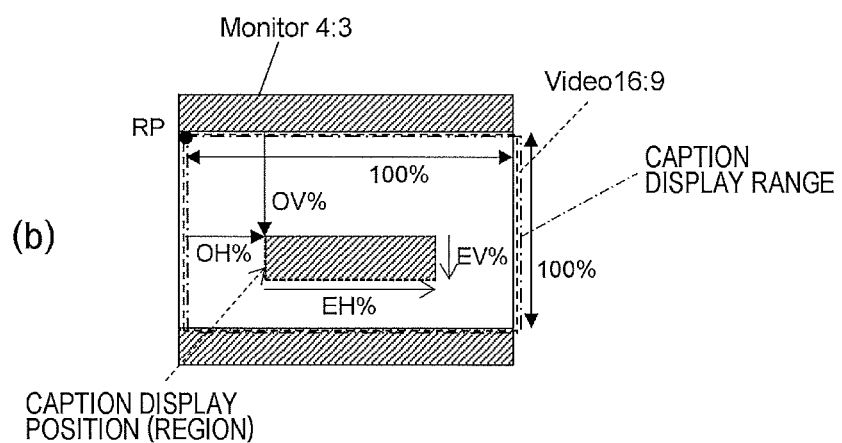
(b)

FIG. 21

```
<tt xml:lang=" " xmlns="http://www.w3.org/ns/ttml"
  tts:extent=fullvideo
  xmlns:ttp="http://www.w3.org/ns/ttml#parameter"
  xmlns:tts="http://www.w3.org/ns/ttml#styling"
  xmlns:dto="http://www.example.org/ns/displaytextoverlay"
  dto:RPoffset="Ax%, By%">
  <head>
    <layout>
      <region xml:id="r1" tts:origin="OH% OV%" tts:extent="EH% EV%"/>
    </layout>
  </head>
  <body>
    <p xml:id="p1" region="r1"
  dto:scalingjustify=top
  > ABCDE</p>
  </body>
</tt>
```

FIG. 22

```
<tt xml:lang=" " xmlns="http://www.w3.org/ns/ttml"
  tts:extent=fullvideo
  xmlns:ttp="http://www.w3.org/ns/ttml#parameter"
  xmlns:tts="http://www.w3.org/ns/ttml#styling"
  xmlns:dto="http://www.example.org/ns/displaytextoverlay"
  dto:RPoffset="Ax%, By%">
  <head>
    <layout>
      <region xml:id="r1" tts:origin="OH1% OV1%" tts:extent="EH1% EV1%"/>
      <region xml:id="r2" tts:origin="OH2% OV2%" tts:extent="EH2% EV2%"/>
    </layout>
  </head>
  <body>
    <p xml:id="p1" region="r1"
      dto:scalingjustify=bottom
      > ABCDE</p>
    <p xml:id="p2" region="r2"
      dto:scalingjustify=top
      > FGH</p>
  </body>
</tt>
```

RECEPTION APPARATUS, RECEPTION METHOD, AND TRANSMISSION APPARATUS

TECHNICAL FIELD

The present technology relates to a reception apparatus, a reception method, and a transmission apparatus, and particularly relates to a transmission apparatus or the like that transmits caption information together with video data.

BACKGROUND ART

Conventionally, broadcasting, for example, such as digital video broadcasting (DVB) includes operation of transmitting caption information as bitmap data. In recent years, transmission of the caption information in text character codes, that is, transmission on a text basis is proposed. As the text information, for example, a timed text markup language (TTML) is suggested by the World Wide Web Consortium (W3C) (refer to Patent Document 1).

Conventionally, there is a known technique of designating a caption display position in caption display position information included in caption information by a relative position with respect to a video area, for example. In this case, part of the caption might exceed beyond the display area and not be displayed depending on the display method in a case where the aspect ratio of the video area does not match the aspect ratio of the display area.

CITATION LIST

Patent Document

Patent Document 1: Japanese Patent Application Laid-Open No. 2012-169885

SUMMARY OF THE INVENTION

Problems to be Solved by the Invention

In order to avoid the case where part of the caption exceeds beyond the display area and not displayed depending on the display method as described above, it is conceivable to perform processing on a receiving side that display is to be made onto a relative position with respect to a video area (display video area) displayed on the monitor (display) rather than the relative position with respect to the video area. In that case, in a case where the aspect ratio of the video area is different from the aspect ratio of the display video area, the caption display position might be compressed solely in the horizontal direction, and this might result in caption display that would give a sense of discomfort to the viewer.

An object of the present technology is to make it possible to perform caption display satisfactorily in a case where the caption display position is designated as a relative position.

Solutions to Problems

A concept of the present technology is a reception apparatus including:

a reception unit that receives a container containing a video stream including video data and a subtitle stream including caption information including caption display position information that designates a caption display position by a relative position with respect to a caption display range; and a control unit that controls: video decode processing of decoding the video stream to obtain video data; subtitle decode processing of decoding the subtitle stream to obtain bitmap data of a caption; display position control processing, performed in a case where an aspect ratio of a video area is different from an aspect ratio of the display video area, of determining a caption display position on the basis of the caption display position information with a display video area defined as a caption display range, performing resize processing on the determined caption display position, and performing display position control on the bitmap data of the caption on the basis of the caption display position that has undergone the resize processing; and video superimposition processing of superimposing the caption bitmap data that has undergone the display position control, on the video data.

In the present technology, a reception unit receives a container containing a video stream including video data and a subtitle stream including caption information. Here, the caption display position in the caption display position information included in the caption information is designated as a relative position with respect to the caption display range. The control unit controls video decode processing, subtitle decode processing, display position control processing, and superimposition processing.

The video decode processing decodes a video stream to obtain video data. The subtitle decode processing decodes subtitle streams to obtain bitmap data of captions. In the display position control processing, in a case where the aspect ratio of the video area is different from the aspect ratio of the display video area, the display video area is defined as the caption display range, and the caption display position is determined on the basis of the caption display position information.

In the display position control processing, resize processing is performed on the determined caption display position, and display position control is performed on the caption bitmap data on the basis of the caption display position that has undergone the resize processing. In the video superimposition processing, the bitmap data of the caption that has undergone the display position control is superimposed on the video data. For example, in the resize processing, in a case where the determined caption display position has been compressed solely in the horizontal direction, the position is also compressed in the vertical direction in the same proportion.

In this manner, in a case where the aspect ratio of the video area is different from the aspect ratio of the display video area in the present technology, the caption display position determined with the display video area defined as the caption display range further undergoes resize processing. Therefore, even in a case where the aspect ratio of the video area is different from the aspect ratio of the display video area, the original shape can be maintained as the caption display position, making it possible to perform display of captions satisfactorily without giving the viewer a sense of discomfort.

Note that in the present technology, it is allowable, for example, in the display control processing that in a case where the size in the vertical direction is compressed by resize processing of the caption display position, compression is performed in a state where a predetermined line position is fixed. With this compression executed in a state where the predetermined line position is fixed in this manner, for example, in a case where there are two caption display positions, it is possible to maintain an interval in the vertical direction between the two caption display positions even when the resize processing is performed.

Moreover, in the present technology, for example, caption information contained in a subtitle stream may include information related to the resize processing, and the display position control processing may use the information related to the resize processing to perform the resize processing on the determined caption display position. For example, the information related to the resize processing may be information indicating a line position to be set as a fixed position in a case where the size in the vertical direction is compressed in the resize processing of the caption display position. With the resize processing performed on the basis of the information related to the resize processing in this manner, it is possible to easily perform the resize processing appropriately.

In addition, another concept of the present technology is a reception apparatus including:

a reception unit that receives a container containing a video stream including video data and a subtitle stream including caption information including caption display position information that designates a caption display position by a relative position with respect to a caption display range; and a control unit that controls: video decode processing of decoding the video stream to obtain video data; subtitle decode processing of decoding the subtitle stream to obtain caption bitmap data; display position control processing performed in a case where an aspect ratio of a video area is different from an aspect ratio of the display video area and being processing of setting a caption display range in the display video area, determining a caption display position on the basis of the caption display position information, and performing display position control on the caption bitmap data on the basis of the determined caption display position; and video superimposition processing of superimposing the caption bitmap data that has undergone the display position control, on the video data.

In the present technology, a reception unit receives a container containing a video stream including video data and a subtitle stream including caption information. Here, the caption display position in the caption display position information included in the caption information is designated as a relative position with respect to the caption display range. The control unit controls video decode processing, subtitle decode processing, display position control processing, and superimposition processing. The video decode processing decodes a video stream to obtain video data. The subtitle decode processing decodes subtitle streams to obtain bitmap data of captions.

In a case where the aspect ratio of the video area is different from the aspect ratio of the display video area, the display position control processing sets the caption display range in the display video area, determines the caption display position on the basis of the caption display position information, and performs display position control on the caption bitmap data on the basis of the determined caption display position. For example, the caption display range having the same aspect ratio as the aspect ratio of the video area is set in the display video area. The video superimposing unit superimposes caption bitmap data that has undergone the display position control, on the video data.

In this manner, according to the present technology, in a case where the aspect ratio of the video area is different from the aspect ratio of the display video area, the caption display range is set in the display video area and the caption display position is determined on the basis of the caption display position information. Therefore, even in a case where the aspect ratio of the video area is different from the aspect ratio of the display video area, the original shape can be maintained as the caption display position, making it possible to perform display of captions satisfactorily without giving the viewer a sense of discomfort.

Note that in the present technology, for example, caption information contained in a subtitle stream may include information indicating a caption display range and the display position control processing may use the information indicating a caption display range to set the caption display range in the display video area. In this case, for example, the information indicating a caption display range may be reference point information and aspect ratio information of a caption display range, or reference point information of a caption display range. With the setting of the caption display range performed on the basis of the information indicating a caption display range in this manner, it is possible to easily set the caption display range appropriately in the display video area.

In addition, another concept of the present technology is a transmission apparatus including a transmission unit that transmits a container containing a video stream including video data and a subtitle stream including caption information, in which the caption display position in the caption display position information included in the caption information is designated by a relative position with respect to a caption display range, and the caption information includes information related to resize processing on the caption display position determined on the basis of the caption display position information, performed on a receiving side in a case where the aspect ratio of the video area is different from the aspect ratio of the display video area.

In the present technology, a transmission unit transmits a container containing a video stream including video data and a subtitle stream including caption information. Examples of the container correspond to containers of various formats such as an MPEG-2 TS transport stream, an MMT transport stream adopted in the digital broadcasting standard, and the ISOBMFF (MP4) used for distribution via the Internet.

The caption display position in the caption display position information included in the caption information is designated as a relative position with respect to the caption display range. The caption information includes information related to the resize processing of the caption display position determined on the basis of the caption display position information, performed on the receiving side in a case where the aspect ratio of the video area is different from the aspect ratio of the display video area. For example, the information related to the resize processing may be information indicating a line position to be set as a fixed position in a case where the size in the vertical direction is compressed in the resize processing of the caption display position.

In this manner, the present technology is provided such that the caption information includes information related to the resize processing performed on the receiving side. Since the caption information includes the information related to the resize processing in this manner, the receiving side can perform the resize processing on the basis of this information, making it possible to easily perform the resize processing appropriately.

In addition, another concept of the present technology is
a transmission apparatus including
a transmission unit that transmits a container containing a video stream including video data and a subtitle stream including caption information,
in which the caption display position in caption display position information included in the caption information is designated by a relative position with respect to a caption display range, and
the caption information includes
information indicating the caption display range.

In the present technology, a transmission unit transmits a container containing a video stream including video data and a subtitle stream including caption information. The caption display position in the caption display position information included in the caption information is designated as a relative position with respect to the caption display range. The caption information includes information indicating a caption display range. For example, the information indicating a caption display range may be reference point information and aspect ratio information of a caption display range, or reference point information of a caption display range.

In this manner, in the present technology, caption information includes information indicating a caption display range. With the configuration in which information indicating a caption display range is included in the caption information and with the setting of the caption display range performed on the basis of the information in this manner, it is possible on the receiving side to easily set the caption display range appropriately in the display video area.

Effects of the Invention

According to the present technology, it is possible to perform caption display satisfactorily in a case where the caption display position is designated as a relative position. Note that effects described here in the present specification are provided for purposes of exemplary illustration and are not intended to be limiting. Still other additional effects may also be contemplated.

BRIEF DESCRIPTION OF DRAWINGS

FIG. 2 is a diagram illustrating an example of a caption display position (region) determined by caption display position information.

FIG. 3 is a diagram illustrating an exemplary structure of TTML (one caption display position).

FIG. 4 is a diagram illustrating main information contained in the TTML structure.

FIG. 5 is a diagram illustrating an exemplary structure of TTML (two caption display positions).

FIG. 6 is a diagram illustrating a caption display example (one caption display position) in a case where the aspect ratio of the video area is the same as the aspect ratio of the display video area.

FIG. 18 is a diagram illustrating determination of the caption display position in the mode of displaying the entire video area and in a case where the caption display range is not designated.

FIG. 21 is a diagram illustrating an exemplary structure (one caption display position) of TTML in a case where reference point information (RPoffset) alone is included as information indicating a caption display range.

FIG. 22 is a diagram illustrating an exemplary structure (two caption display positions) of TTML in a case where reference point information (RPoffset) alone is included as information indicating a caption display range.

MODE FOR CARRYING OUT THE INVENTION

Hereinafter, embodiments of the present invention (hereinafter, embodiment(s)) will be described. Note that description will be presented in the following order.
1. Embodiments
2. Modifications

1. Embodiment

[Exemplary Configuration of Transmission-Reception System]

Figure 1:
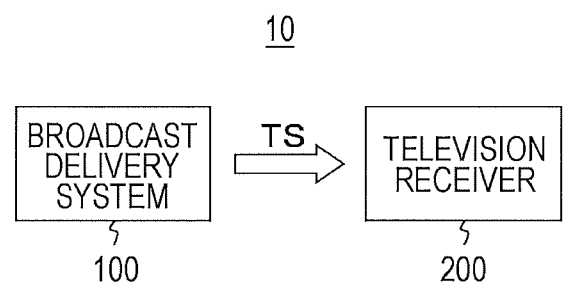
FIG. 1 is a block diagram illustrating an exemplary configuration of a transmission-reception system according to an embodiment.

FIG. 1 illustrates an exemplary configuration of a transmission-reception system 10 according to an embodiment. The transmission-reception system 10 includes a broadcast delivery system 100 and a television receiver 200. The broadcast delivery system 100 transmits a transport stream of MPEG-2 TS (hereinafter simply referred to as "transport stream TS") as a container (multiplexed stream) on a broadcast wave and transmits the transport stream.

The transport stream TS contains a video stream including video data and a subtitle stream including caption (subtitle) information. Herein, the caption information is text information of captions of a predetermined format. While the text information includes, for example, TTML or a TTML derived format or the like, the embodiment is a case where TTML is used as the text information format. The caption display position (region) in caption display position information included in the TTML is designated by a relative position (proportional value) with respect to a caption display range.

The TTML includes information related to the resize processing of the caption display position determined on the basis of the caption display position information, performed on the receiving side in a case where the aspect ratio of the video area is different from the aspect ratio of the display video area. According to the present embodiment, the information related to the resize processing is information indicating a line position to be set as a fixed position in a case where the size in the vertical direction is compressed in the resize processing on the caption display position.

In addition, this TTML includes information indicating a caption display range. According to the present embodiment, the information indicating a caption display range is reference point information and aspect ratio information of the caption display range, or reference point information of the caption display range.

The television receiver 200 receives the transport stream TS sent from the broadcast delivery system 100. The television receiver 200 performs decode processing on the video stream including video data to obtain video data, and performs decode processing on the subtitle stream including caption information to obtain caption bitmap data. As described above, the caption display position in the caption display position information included in the caption information is designated as a relative position with respect to the caption display range.

The television receiver 200 determines the caption display position on the basis of the caption display position information and performs display position control on caption bitmap data on the basis of the determined caption display position. The television receiver 200 superimposes the caption bitmap data that has undergone the display position control on the video data to obtain video data for display.

In a case where the aspect ratio of the video area is different from the aspect ratio of the display video area (video area displayed on the monitor) as the display position control for the caption bitmap data, the television receiver 200 selectively performs one of a first method and a second method described below.

With the first method, in a case where the aspect ratio of the video area is different from the aspect ratio of the display video area, the television receiver 200 defines the display video area as the caption display range and determines the caption display position on the basis of the caption display position information, and performs resize processing on the determined caption display position and performs display position control on the caption bitmap data on the basis of the determined caption display position.

The resize processing is processing of restoring the original shape as the caption display position, and for example, in a case where the determined caption display position is compressed solely in the horizontal direction, the position is also compressed in the vertical direction in the same proportion. For example, in a case where the size in the vertical direction is compressed by the resize processing, compression is performed in a state where a predetermined line position such as a top line (upper line), a bottom line (lower line), or a middle line (intermediate line) is fixed.

With appropriate selection of the predetermined line position, for example, in a case where there are two caption display positions, it is possible to maintain an interval in the vertical direction between the two caption display positions even when the resize processing is performed. The television receiver 200 can utilize the information when the caption information included in the subtitle stream includes information indicating the line position to be set as a fixed position as information related to the resize processing.

With the second method, in a case where the aspect ratio of the video area is different from the aspect ratio of the display video area, the television receiver 200 sets a caption display range in the display video area, determines the caption display position on the basis of the caption display position information, and performs display position control on the caption bitmap data on the basis of the determined caption display position. In this case, a caption display range having the same aspect ratio as the aspect ratio of the video area is set in the display video area, for example.

In a case where the caption information contained in the subtitle stream includes information indicating a caption display range, the television receiver 200 can appropriately set the caption display range using the information. For example, the television receiver 200 selects the second method when the caption information contained in the subtitle stream includes information indicating a caption display range, and selects the first method when the information is not included.

FIG. 2 illustrates an example of a caption display position (region) determined by caption display position information. This example illustrates a case of the TTML in which the caption display position information is given by information indicating a base point (origin) "origin="OH%OV%", and by information indicating an area (extent) of the caption display position "extent="EH%EV%". The sign "RP" indicates a reference point which is the top-left of the caption display range.

FIG. 2(a) illustrates an example in a case where the aspect ratio of the video area is the same as the aspect ratio of the display video area. In this example, when the aspect ratio of the video area is 16:9, the aspect ratio of the monitor is 16:9, and the aspect ratio of the display video area is 16:9. In this case, the display video area is defined as the caption display range, and the caption display position is determined on the basis of the caption display position information designated by the relative position with respect to the display video area.

FIG. 2(b) is an exemplary case where the aspect ratio of the video area is different from the aspect ratio of the display video area and where the display video area is defined as the caption display range and the caption display position is determined on the basis of the caption display position information (first method). In this example, in a case where the aspect ratio of the video area is 16:9, the aspect ratio of the monitor is 4:3, and the display method is center-cut, leading to the aspect ratio of the display video area being 4:3. In this case, while the caption display position has the same width in the vertical direction as compared with the case of FIG. 2(a), its width is compressed in the horizontal direction. In this case, the shape of the caption display position is different from the case of FIG. 2(a).

FIG. 2(c) illustrates an exemplary case where the aspect ratio of the video area is different from the aspect ratio of the display video area, the caption display range is set in the display video area, and the caption display position is determined on the basis of the caption display position information (second method). In this example, in a case where the aspect ratio of the video area is 16:9, the aspect ratio of the monitor is 4:3, and the display method is center-cut, leading to the aspect ratio of the display video area being 4:3. In this case, while the caption display position has the width compressed both in the vertical and horizontal directions as compared with the case of FIG. 2(a). In a case where the aspect ratio of the caption display range to be set is 16:9, the shape of the caption display position is the same as in the case of FIG. 2(a).

FIG. 3 illustrates an exemplary TTML structure. This example is an exemplary case where there is one caption display position (region). TTML is described on the basis of XML. In the tt root container, language and namespace are defined. The namespace is defined as a unique element name that can be uniquely identified in all elements in a system or a standard system. Moreover, in <tt>, "tts: extent" first declares a target area of video 100% as a source of the caption position information. "Fullvideo" represents an entire video with resolution of 3840 (H)×2160 (V) in a case where 4K video is the target, while it illustrates an entire video with a resolution of 1920 (H)×1080 (V) in a case where 2K (full HD) video is the target.

While detailed description of namespaces of "xmlns=http://www.w3.org/ns/ttml", "xmlns:ttp=http://www.w3.org/ns/ttml#parameter", "xmlns:tts=http://www.w3.org/ns/ttml#styling" will be omitted, they are namespaces such as parameters and styling which are secured as attribute classes of TTML in W3C beforehand.

"xmlns:dto=http://www.example.org/ns/displaytextoverlay" is a newly defined namespace. This namespace is used for inserting information indicating a caption display range. Then, "dto: dispasp="16:9"" and "dto:RPoffset="Ax%, By%"" indicates information indicating a caption display range.

"dto:dispasp="16:9"" indicates the aspect ratio information of the caption display range, and that the caption display range is the area of aspect ratio 16:9. While the illustrated example illustrates that the aspect ratio of the caption display range is 16:9, the aspect ratio of the caption display range may be designated 4:3, 21:9, or the like, as illustrated in FIG. 4. "dto:RPoffset="Ax%, By%"" indicates a reference point information of the caption display range, and as illustrated in FIG. 4, the position of the reference point (RP) of the caption display range when each of the horizontal and vertical portions of the display video area is 100% is indicated by the ratio of the offset from the top-left of the display video area.

A header (head) contains an element of layout. The region ID is indicated by "r1", and the starting point (origin) of the caption display position and the area (extent) are illustrated by relative positions as the caption display position information. That is, "origin="OH%OV%"" indicates a base point of the caption display position, indicating that the starting point is OH from the left and OV% from the top. In addition, "extent="EH%EV%"" indicates an area of the caption display position, indicating that the horizontal width is EH% and the vertical width is EV%.

In the body, XML ID is indicated by "p1" and region ID is indicated by "r1", while text data of caption (subtitle) is described. Here, the text data is represented by "ABCDE". "dto:scalingjustify=top" constitutes information related to the resize processing, and indicates a line position to be set as a fixed position in a case where the size in the vertical direction is to be compressed by the resize processing of the caption display position. While the illustrated example is a case where the line position to be set as the fixed position is the top line (upper line), it is also possible to designate the bottom line (lower line), the middle line (intermediate line) or the like as illustrated in FIG. 4.

FIG. 5 also illustrates an exemplary TTML structure. This example is an exemplary case where there are two caption display positions (regions). The tt root container is similar to the case of FIG. 3, and thus description will be omitted.

A header (head) contains an element of layout. The region ID of the first caption display position is indicated by "r1", and the starting point (origin) of the caption display position and the area (extent) are illustrated by relative positions as the caption display position information. That is, "origin="OH1%OV1%"" indicates that the starting point is OH1% from the left and OV1% from the top. In addition, "extent="EH1%EV1%"" indicates that the horizontal width of the area is EH1% and the vertical width of the area is EV1%.

Moreover, the region ID of the second caption display position is indicated by "r2", and the starting point (origin) and the area (extent) of the caption display position are illustrated by relative positions as the caption display position information. That is, "origin="OH2%OV2%"" indicates that the starting point is OH2% from the left and OV2% from the top. In addition, "extent="EH2%EV2%"" indicates that the horizontal width of the area is EH2% and the vertical width of the area is EV2%.

In the body, in relation with the first caption position, XML ID is indicated by "p1" and region ID is indicated by "r1", while text data of caption (subtitle) is described. Here, the text data is represented by "ABCDE". "dto:scalingjustify=bottom" constitutes information related to the resize processing, and indicates a line position to be set as a fixed position in a case where the size in the vertical direction is to be compressed by the resize processing of the caption display position. The illustrated example illustrates a case where the line position to be set as the fixed position is the bottom line (lower line).

Moreover, in the body, in relation with the second caption position, XML ID is indicated by "p2" and region ID is indicated by "r2", while text data of caption (subtitle) is described. Here, the text data is represented by "FGH".

"dto:scalingjustify=top" constitutes information related to the resize processing, and indicates a line position to be set as a fixed position in a case where the size in the vertical direction is to be compressed by the resize processing of the caption display position. In the illustrated example, the line position to be set as the fixed position is the top line (upper line).

FIG. 6 illustrates a display example of captions (subtitles) in a case where the aspect ratio of the video area and the aspect ratio of the display video area (video area displayed on the monitor) are the same. The illustrated example is an exemplary case where the aspect ratio of the video area is 16:9 and the aspect ratio of the monitor is also 16:9, having the TTML structure (one caption display position) as illustrated in FIG. 3.

In the illustrated example, the video area is indicated by a broken line frame, while the monitor area is indicated by a solid line frame. In this case, as illustrated by a one-dot chain line frame, the display video area is defined as a caption display range, and the caption display position (region) is determined on the basis of caption display position information ("origin="OH%OV%"", "extent="EH%EV%"") designated by a relative position with respect to the range. The sign "RP" indicates a reference point which is the top-left of the caption display range.

The caption "ABCDE" in text data is displayed at the caption display position determined in this manner. Note that while in the illustrated example, the frames indicating the video area, the monitor area, and the caption display range are not aligned in display, this illustration is presented for clearly displaying individual frames, and the frames are aligned with each other in practice. Although the explanation is omitted, the similar display will be presented in the following drawings.

Figure 7:
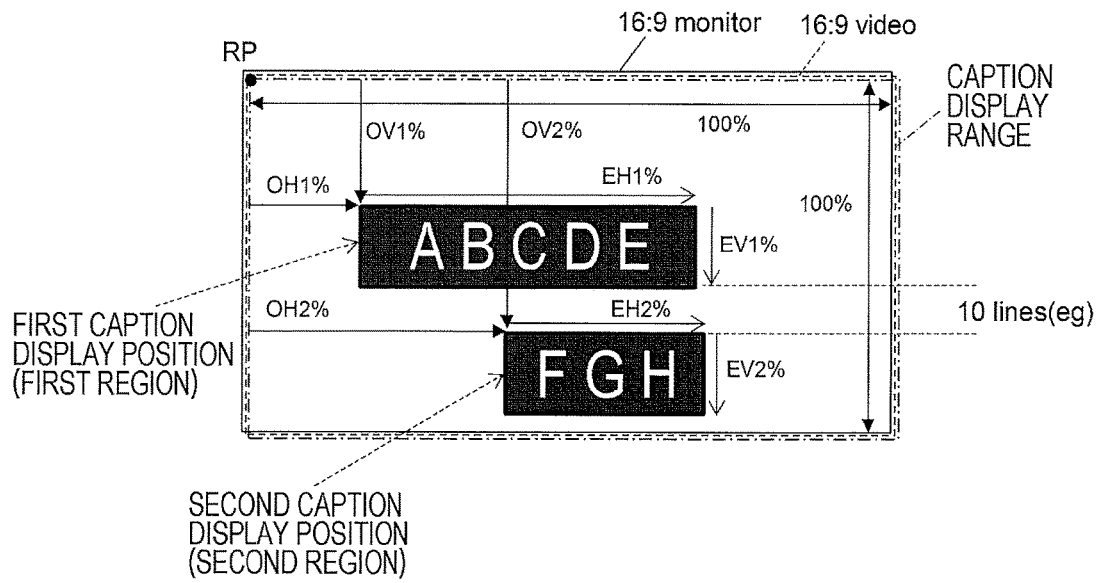
FIG. 7 is a diagram illustrating a caption display example (two caption display positions) in a case where the aspect ratio of the video area is the same as the aspect ratio of the display video area.

FIG. 7 also illustrates a display example of captions (subtitles) in a case where the aspect ratio of the video area and the aspect ratio of the display video area (video area displayed on the monitor) are the same. The illustrated example is an exemplary case where the aspect ratio of the video area is 16:9 and the aspect ratio of the monitor is also 16:9, having the TTML structure (two caption display positions) as illustrated in FIG. 5.

In the illustrated example, the video area is indicated by a broken line frame, while the monitor area is indicated by a solid line frame. In this case, as illustrated by a one-dot chain line frame, the display video area is defined as a caption display range, and the first and second caption display positions (regions) are determined on the basis of caption display position information ("origin="OH1%OV1%"", "extent="EH1%EV1%"", "origin="OH2%OV2%"", and "extent="EH2%EV2%"") designated by a relative position with respect to the range.

Then, the caption "ABCDE" in text data is displayed in the first caption display position (first region), while the caption "FGH" in text data is displayed in the second caption display position (second region). In this case, the interval between the two caption display positions (regions) is 10 lines, for example.

Figure 8:
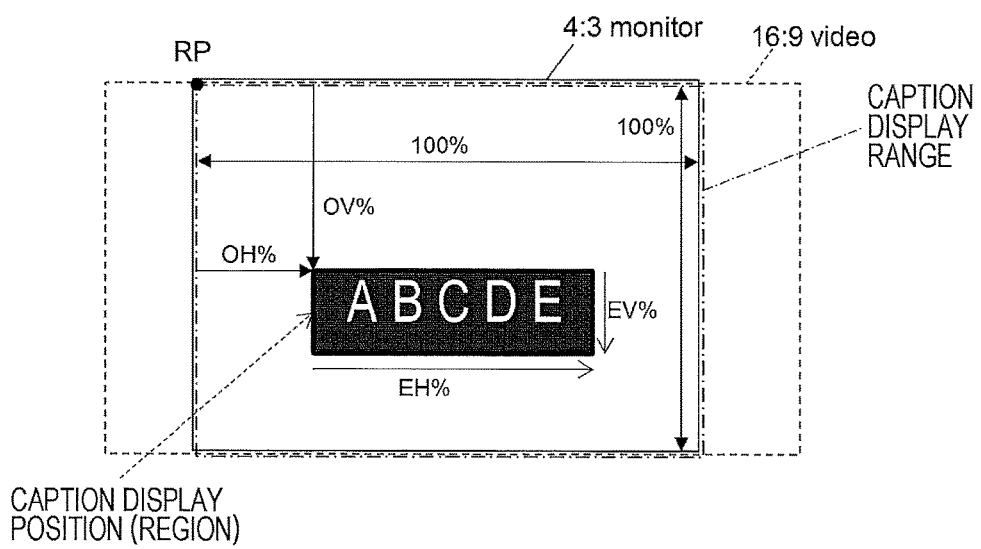
FIG. 8 is a diagram illustrating an example of caption display (one caption display position) in a case where the aspect ratio of the video area is different from the aspect ratio of the display video area and in a case where the display video area is defined as the caption display range and the caption display position is determined on the basis of caption display position information (first method).

FIG. 8 is a diagram illustrating an example of displaying caption (subtitle) in a case where the aspect ratio of the video area is different from the aspect ratio of the display video area (video area displayed on the monitor) and in a case where the display video area is defined as the caption display range and the caption display position is determined on the basis of the caption display position information (first method). The illustrated example is an exemplary case where the aspect ratio of the video area is 16:9 and the aspect ratio of the monitor is 4:3, having the TTML structure (one caption display position) as illustrated in FIG. 3.

In the illustrated example, the video area is indicated by a broken line frame, while the monitor area is indicated by a solid line frame. In this case, as illustrated by a one-dot chain line frame, the display video area is defined as a caption display range, and the caption display position (region) is determined on the basis of caption display position information ("origin="OH%OV%"", "extent="EH%EV%"") designated by a relative position with respect to the range. In addition, the caption "ABCDE" in text data is displayed at the caption display position.

In this case, while the caption display position has the same width in the vertical direction as compared with the case of FIG. 6, its width is compressed in the horizontal direction. In this case, together with the compression of the width of the caption display position, the font size of the caption is also adjusted to a smaller size. As illustrated in the drawing, while adjustment of the font size of the caption allows the relation between the caption display position and the caption displayed in the position to be aligned in the horizontal direction, the relation between the caption display position and the caption displayed in the position is not aligned in the vertical direction in which the width of the caption display position is not compressed. This gives the viewer a sense that the black area of the caption display position is projecting.

Figure 9:
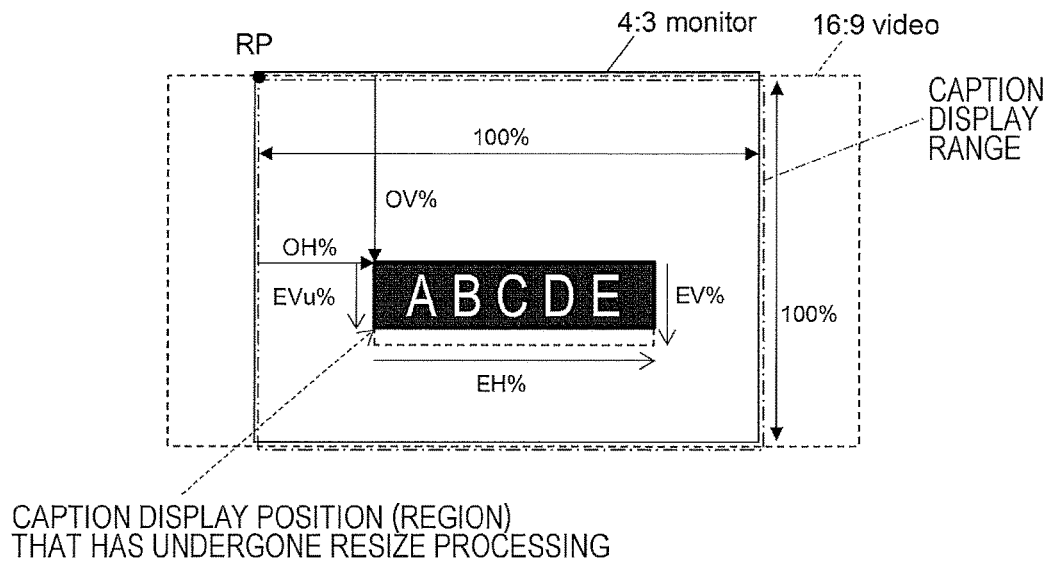
FIG. 9 is a diagram illustrating a display example in a case where resize processing is performed.

In view of the above, the first method as described above performs the resize processing on the determined caption display position, so as to achieve alignment in the relationship between the caption display position and the caption displayed on the caption display position not solely in the horizontal direction but also in the vertical direction. FIG. 9 illustrates a display example in which resize processing is performed. In this case, the caption display position compressed solely in the horizontal direction by the determination based on the caption display position information ("origin="OH%OV%"" and "extent="EH%EV%"") is compressed by the resize processing in the same proportion also in the vertical direction. In this case, as a result, the caption display position is determined by caption display position information ("origin="OH%OV%"", and "extent="EH%EVu%""). In this case, the relationship would be EVu=¾*EV.

When the resize processing is performed in this manner, compression of the width in the vertical direction is performed in a state where the predetermined line position is fixed. The illustrated example is an example in which a predetermined line position is set as a top line (upper line) on the basis of information of "dto:scalingjustify=top" included in TTML. Note that in the illustrated example, the broken line frame illustrates the caption display position before compression of the width in the vertical direction is performed.

Figure 10:
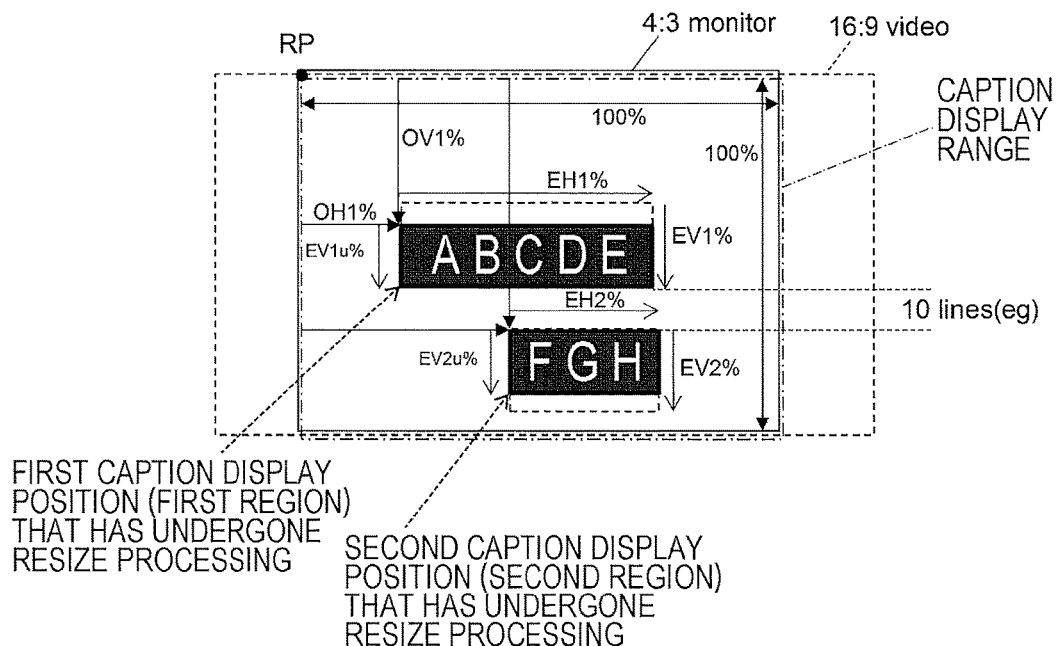
FIG. 10 is a diagram illustrating an example of caption display (two caption display positions) in a case where the aspect ratio of the video area is different from the aspect ratio of the display video area and in a case where the display video area is defined as the caption display range and the caption display position is determined on the basis of caption display position information, and resize processing is further performed (first method).

FIG. 10 is also a diagram illustrating an example of displaying a caption (subtitle) in a case where the aspect ratio of the video area is different from the aspect ratio of the display video area (video area displayed on the monitor) and in a case where the display video area is defined as the caption display range and the caption display position is determined on the basis of the caption display position information (first method). The illustrated example is an exemplary case of display where the aspect ratio of the video area is 16:9 and the aspect ratio of the monitor is 4:3, having the TTML structure (two caption display position) as illustrated in FIG. 5, with resize processing performed.

In the illustrated example, the video area is indicated by a broken line frame, while the monitor area is indicated by a solid line frame. In this case, as illustrated by a one-dot chain line frame, the display video area is defined as a caption display range, and the first and second caption display positions (regions) are determined on the basis of caption display position information ("origin="OH1%OV1%"", "extent="EH1%EV1%"", "origin="OH2%OV2%"", and "extent="EH2%EV2%"") designated by a relative position with respect to the range, and thereafter, resize processing is further performed.

In this case, as a result, the first caption display position (first region) is determined by caption display position information ("origin="OH1%OV1%"" and "extent="EH1%EV1u%""). In this case, the relationship would be $EV1u = \frac{3}{4} * EV1$. Similarly, in this case, as a result, the second caption display position (second region) is determined by caption display position information ("origin="OH2%OV2%"" and "extent="EH2%EV2u%""). In this case, the relationship would be $EV2u = \frac{3}{4} * EV2$.

Then, the caption "ABCDE" in text data is displayed in the first caption display position (first region), while the caption "FGH" in text data is displayed in the second caption display position (second region). In this case, the font size of the caption is adjusted so as to be aligned in accordance with the compression of the caption display position (region).

When the resize processing is performed, compression of the width in the vertical direction is performed in a state where the predetermined line position is fixed. The illustrated example is an exemplary case where the predetermined line position is set to the bottom line (lower line) with relation to the first caption display position (first region) on the basis of the information of "dto:scalingjustify=bottom" included in the TTML. Moreover, this is an exemplary case where the predetermined line position is set to the top line (upper line) with relation to the second caption display position (second region) on the basis of the information of "dto:scalingjustify=top" included in the TTML.

In this manner, the predetermined line position in the first and second caption display positions are selected, whereby, for example, 10 lines are maintained as the interval between the first and second caption display positions, similarly to the case of the display example of FIG. 7. This makes it possible to substantially maintain the perceptibility of captions (subtitles) on the display image by the viewer.

Figure 11:
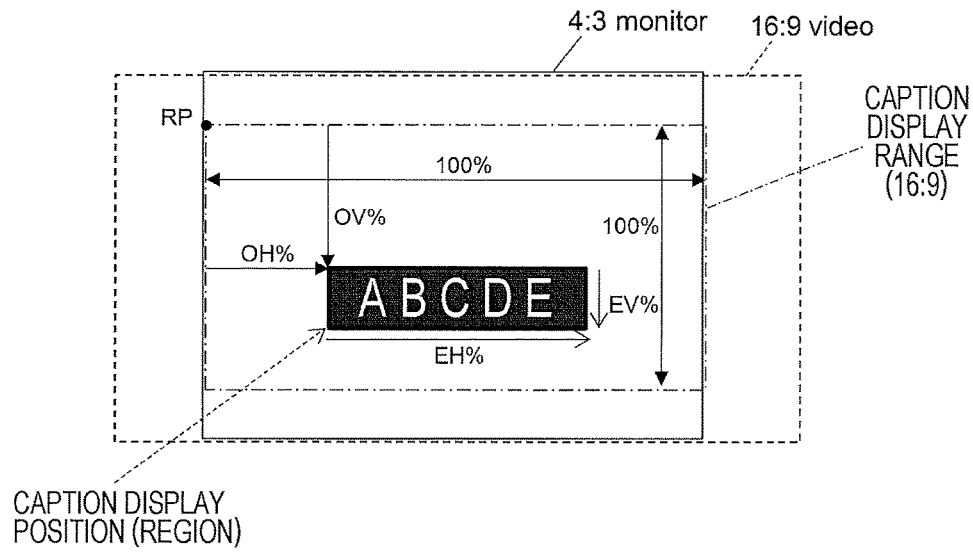
FIG. 11 is a diagram illustrating an example of caption display (one caption display position) in a case where the aspect ratio of the video area is different from the aspect ratio of the display video area and in a case where the caption display range is set in the display video area and the caption display position is determined on the basis of caption display position information (second method).

FIG. 11 is a diagram illustrating an example of displaying a caption (subtitle) in a case where the aspect ratio of the video area is different from the aspect ratio of the display video area (video area displayed on the monitor) and in a case where the caption display range is set in the display video area and the caption display position is determined on the basis of the caption display position information (second method). The illustrated example is an exemplary case of display where the aspect ratio of the video area is 16:9 and the aspect ratio of the monitor is 4:3, having the TTML structure (one caption display position) as illustrated in FIG. 3.

In the illustrated example, the video area is indicated by a broken line frame, while the monitor area is indicated by a solid line frame. In this case, as illustrated by a one-dot chain line frame, the caption display range is set in the display video area and the caption display position (region) is determined on the basis of caption display position information ("origin="OH%OV%"", "extent="EH%EV%"") designated by a relative position with respect to the range. In addition, the caption "ABCDE" in text data is displayed at the caption display position. In this case, the font size of the caption is adjusted so as to be aligned in accordance with the compression of the caption display position (region).

In this case, a caption display range having the same aspect ratio as the aspect ratio of the video area is set in the display video area, for example. The illustrated example is an exemplary case where the caption display range with the aspect ratio of 16:9 is set in the display video area on the basis of information indicating a caption display range included in the TTML, that is, the reference point information ("dto:RPoffset="Ax%, By%"") of the caption display range and the aspect ratio information ("dto:dispasp="16:9"").

In this case, the caption display position is compressed in width in both the vertical direction and the horizontal direction, so as to form the shape of the caption display position the same as the case of FIG. 6, and thus, there is no need to perform caption display position adjustment (resize processing) in accordance with the adjustment of the font size of the caption.

Figure 12:
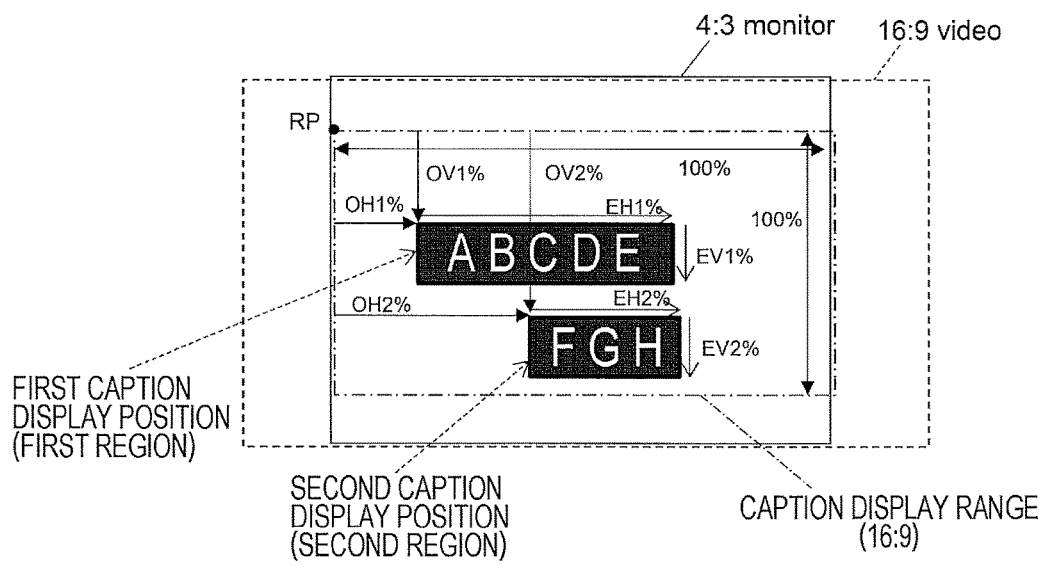
FIG. 12 is a diagram illustrating an example of caption display (two caption display positions) in a case where the aspect ratio of the video area is different from the aspect ratio of the display video area and in a case where the caption display range is set in the display video area and the caption display position is determined on the basis of caption display position information (second method).

FIG. 12 also is a diagram illustrating an example of displaying a caption (subtitle) in a case where the aspect ratio of the video area is different from the aspect ratio of the display video area (video area displayed on the monitor) and in a case where the caption display range is set in the display video area and the caption display position is determined on the basis of the caption display position information (second method). The illustrated example is an exemplary case of display where the aspect ratio of the video area is 16:9 and the aspect ratio of the monitor is 4:3, having the TTML structure (two caption display position) as illustrated in FIG. 5.

In the illustrated example, the video area is indicated by a broken line frame, while the monitor area is indicated by a solid line frame. In this case, as illustrated by a one-dot chain line frame, the display video area is defined as a caption display range, and the first and second caption display positions (regions) are determined on the basis of caption display position information ("origin="OH1%OV1%"", "extent="EH1%EV1%"", "origin="OH2%OV2%"", and "extent="EH2%EV2%"") designated by a relative position with respect to the range. Then, the caption "ABCDE" in text data is displayed in the first caption display position (first region), while the caption "FGH" in text data is displayed in the second caption display position (second region).

[Exemplary Configuration of Stream Generation Unit of Broadcast Delivery System]

Figure 13:
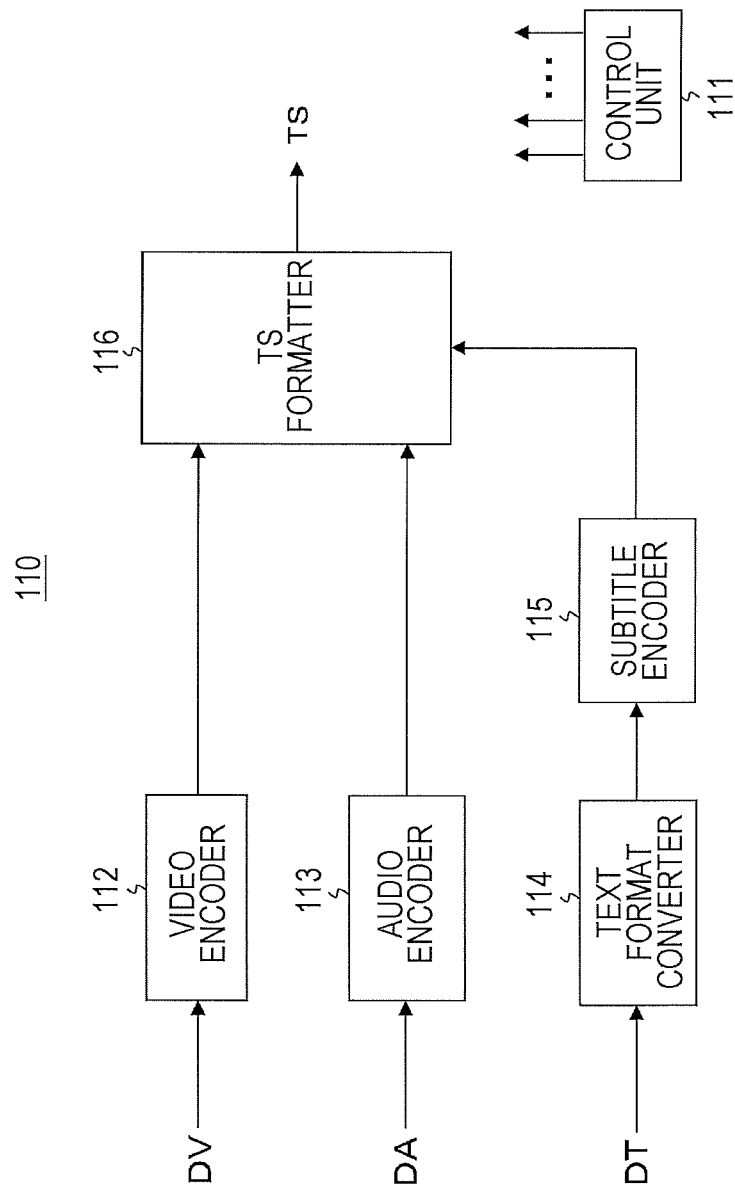
FIG. 13 is a block diagram illustrating an exemplary configuration of a stream generation unit of a broadcast delivery system.

FIG. 13 illustrates an exemplary configuration of a stream generation unit 110 of the broadcast delivery system 100. The stream generation unit 110 includes a control unit 111, a video encoder 112, an audio encoder 113, a text format converter 114, a subtitle encoder 115, and a TS formatter (multiplexer) 116.

The control unit 111 includes a central processing unit (CPU), for example, and controls operation of each of portions of the stream generation unit 110. The video encoder 112 inputs video data DV, encodes the video data DV, and generates a video stream (PES stream) formed with a video PES packet having encoded video data in the payload.

The audio encoder 113 inputs the audio data DA, encodes the audio data DA, and generates an audio stream (PES stream) formed with an audio PES packet having encoded audio data. The text format converter 114 inputs text data (character code) DT and obtains timed text markup language (TTML) as caption information (refer to FIGS. 3 and 5).

The caption display position (region) in caption display position information included in the TTML is designated by a relative position (proportional value) with respect to a caption display range. Moreover, this TTML includes information related to resize processing of the caption display position to be performed on the receiving side in a case where the aspect ratio of the video area is different from the aspect ratio of the display video area, for example, information indicating the line position to be set as the fixed position in a case where the size in the vertical direction is compressed by the resize processing of the caption display position. In addition, this TTML includes information indicating a caption display range (reference point information of the caption display range and aspect ratio information).

The subtitle encoder 115 converts the TTML obtained by the text format converter 114 into various segments, and generates a subtitle stream (PES stream) formed with the subtitle PES packet arranging these segments (caption information) in the payload.

The TS formatter 116 packetizes the video stream generated by the video encoder 112, the audio stream generated by the audio encoder 113, and the subtitle stream generated by the subtitle encoder 115, into a transport packet and multiplexes the packetized streams, thereby obtaining a transport stream TS as a container (multiplexed stream).

Operation of the stream generation unit 110 illustrated in FIG. 13 will be briefly described. The video data DV is supplied to the video encoder 112. The video encoder 112 encodes the video data DV and generates a video stream (PES stream) formed with the video PES packet having encoded video data in the payload. This video stream is supplied to the TS formatter 116.

The audio data DA is also supplied to the audio encoder 113. The audio encoder 113 encodes the audio data DA and generates an audio stream (PES stream) formed with an audio PES packet having encoded audio data. This audio stream is supplied to the TS formatter 116.

Moreover, the text data (character code) DT is supplied to the text format converter 114. This text format converter 114 obtains TTML as caption information (refer to FIGS. 3 and 5). The TTML is supplied to the subtitle encoder 115. The subtitle encoder 115 converts the TTML into various segments and generates a subtitle stream formed with the subtitle PES packet in each of which these segments are arranged in the payload. This subtitle stream is supplied to the TS formatter 116.

The TS formatter 116 packetizes the video stream generated by the video encoder 112, the audio stream generated by the audio encoder 113, and the subtitle stream generated by the subtitle encoder 115, into a transport packet and multiplexes the packetized streams, thereby generating the transport stream TS as a container (multiplexed stream).

[Exemplary Configuration of Television Receiver]

Figure 14:
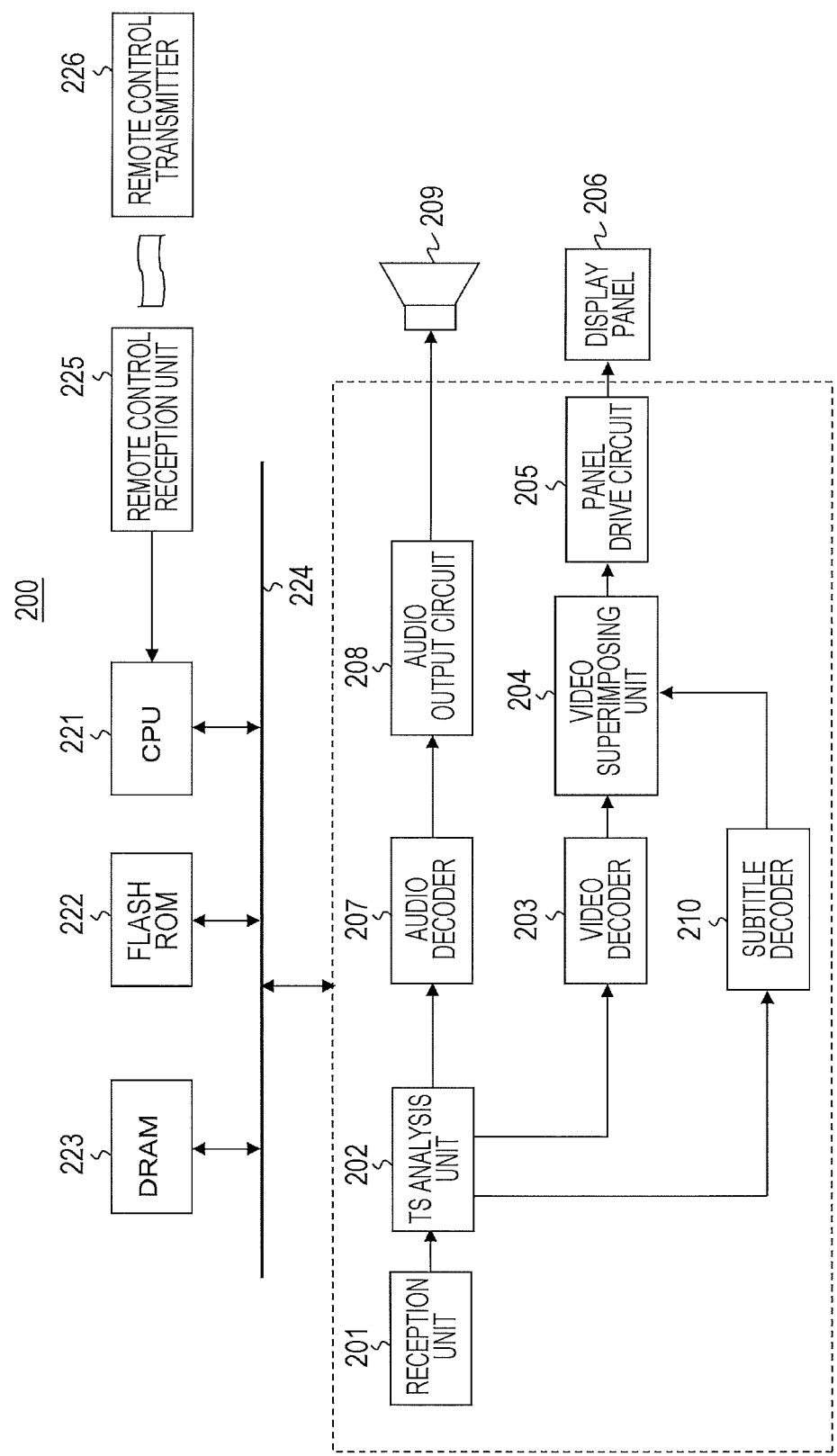
FIG. 14 is a block diagram illustrating an exemplary configuration of a television receiver.

FIG. 14 illustrates an exemplary configuration of the television receiver 200. The television receiver 200 includes a reception unit 201, a TS analysis unit (demultiplexer) 202, a video decoder 203, a video superimposing unit 204, a panel drive circuit 205, and a display panel 206 as a monitor (display). Moreover, the television receiver 200 includes an audio decoder 207, an audio output circuit 208, a speaker 209, and a subtitle decoder 210. Moreover, the television receiver 200 includes a CPU 221, a flash ROM 222, a DRAM 223, an internal bus 224, a remote control reception unit 225, and a remote control transmitter 226.

The CPU 221 controls operation of each of portions of the television receiver 200. The flash ROM 222 stores control software and data. The DRAM 223 constitutes a work area of the CPU 221. The CPU 221 develops the software and data read from the flash ROM 222 onto the DRAM 223 to activate the software, and controls each of portions of the television receiver 200.

The remote control reception unit 225 receives a remote control signal (remote control code) transmitted from the remote control transmitter 226, and supplies the received signal to the CPU 221. The CPU 221 controls each of portions of the television receiver 200 on the basis of this remote control code. The CPU 221, the flash ROM 222, and the DRAM 223 are connected to the internal bus 224.

The reception unit 201 receives the transport stream TS sent from the broadcast delivery system 100 over the broadcast waves. As described above, the transport stream TS includes the video stream, the audio stream, and the subtitle stream. The TS analysis unit 202 extracts the PES packet of each of the video stream, the audio stream, and the subtitle stream, from the transport stream TS.

The audio decoder 207 performs decode processing on the audio PES packet obtained by the TS analysis unit 202 and then obtains audio data. The audio output circuit 208 performs required processing such as D/A conversion and amplification on the audio data, and supplies the processed data to the speaker 209. The video decoder 203 performs decode processing on the video PES packet obtained by the TS analysis unit 202 and then obtains video data. Note that the video decoder 203 also performs resolution conversion of video data as appropriate in accordance with the display mode or the like. For example, in a case where the aspect ratio of the video area is 16:9 and the aspect ratio of the monitor (display) is 4:3, and the display mode is the letterbox, the resolution conversion of the video data is performed.

The subtitle decoder 210 performs decode processing on the subtitle PES packet obtained by the TS analysis unit 202 to convert text data (font data) of caption (subtitle) of each of the caption display positions (regions) included in the TTML into bitmap data (binary image information). In this case, the font size of the caption is adjusted appropriately from the font size designated in TTML under the control of the CPU 221 in accordance with the size of the caption display position determined by caption display position information or obtained by further resize processing.

Moreover, the subtitle decoder 210 extracts various types of information from the TTML and supplies it to the CPU 221. This information also includes attribute information defined by <tt> and <head>. The CPU 221 determines the caption display position on the basis of the caption display position information and further performs resize processing on the determined caption display position as necessary. Details of the procedure of determination and resize processing on the caption display position in the CPU 221 will be further described below.

The video superimposing unit 204 superimposes the bitmap data of the caption at each of the caption display positions obtained from the subtitle decoder 210, on the video data obtained by the video decoder 203 so as to obtain display video data. In this case, the CPU 221 controls so as to set the superimposed position of the caption bitmap data to the caption display position on the basis of the caption display position determined by caption display position information or obtained by further resize processing, as described above.

The panel drive circuit 205 drives the display panel 206 on the basis of the display video data obtained by the video superimposing unit 204. The display panel 206 includes a liquid crystal display (LCD), an organic electroluminescence (EL) display, and the like, for example.

Operation of the television receiver 200 illustrated in FIG. 14 will be briefly described. The reception unit 201 receives the transport stream TS sent from the broadcast delivery system 100 over the broadcast waves. The transport stream TS includes the video stream, the audio stream, and the subtitle stream. The transport stream TS is supplied to the TS analysis unit 202. The TS analysis unit 202 extracts the PES packet of each of the video stream, the audio stream, and the subtitle stream, from the transport stream TS.

The video PES packet extracted by the TS analysis unit 202 is supplied to the video decoder 203. In the video decoder 203, decode processing is performed on the video PES packet so as to obtain video data. In this case, the video decoder 203 appropriately converts the resolution of the video data according to the display mode or the like.

Moreover, the subtitle PES packet extracted by the TS analysis unit 202 is supplied to the subtitle decoder 210. The subtitle decoder 210 performs decode processing on the subtitle PES packet obtained by the TS analysis unit 202 and thus, bitmap data of caption for each of the caption display positions to be superimposed on the video data is obtained on the basis of the text data included in TTML.

Moreover, the subtitle decoder 210 extracts various types of information from the TTML and supplies it to the CPU 221. This information also includes attribute information defined by <tt> and <head>. The CPU 221 determines the caption display position on the basis of the caption display position information and further performs resize processing on the determined caption display position as necessary.

The bitmap data of each of the caption display positions output from subtitle decoder 210 is supplied to the video superimposing unit 204. The video superimposing unit 204 superimposes the bitmap data of the caption at each of the caption display positions, obtained from the subtitle decoder 210, on the video data obtained by the video decoder 203 so as to obtain display video data. In this case, the CPU 221 controls so as to set the superimposed position of the caption bitmap data to the caption display position on the basis of the caption display position determined by caption display position information or obtained by further resize processing.

The display video data obtained by the video superimposing unit 204 is supplied to the panel drive circuit 205. The panel drive circuit 205 drives the display panel 206 on the basis of the display video data. With this configuration, an image on which a caption (subtitle) is superimposed on each of the caption display positions (regions) is displayed on the display panel 206.

Moreover, the audio PES packet extracted by the TS analysis unit 202 is supplied to the audio decoder 207. The audio decoder 207 performs decode processing on the audio PES packet and then obtains audio data. This audio data is supplied to the audio output circuit 208. The audio output circuit 208 performs necessary processing such as D/A conversion and amplification on the audio data. Then, the processed audio data is supplied to the speaker 209. With this configuration, an audio output corresponding to the display image of the display panel 206 is obtained from the speaker 209.

"Procedure of Determination and Resize Processing on Caption Display Position"

Figure 15:
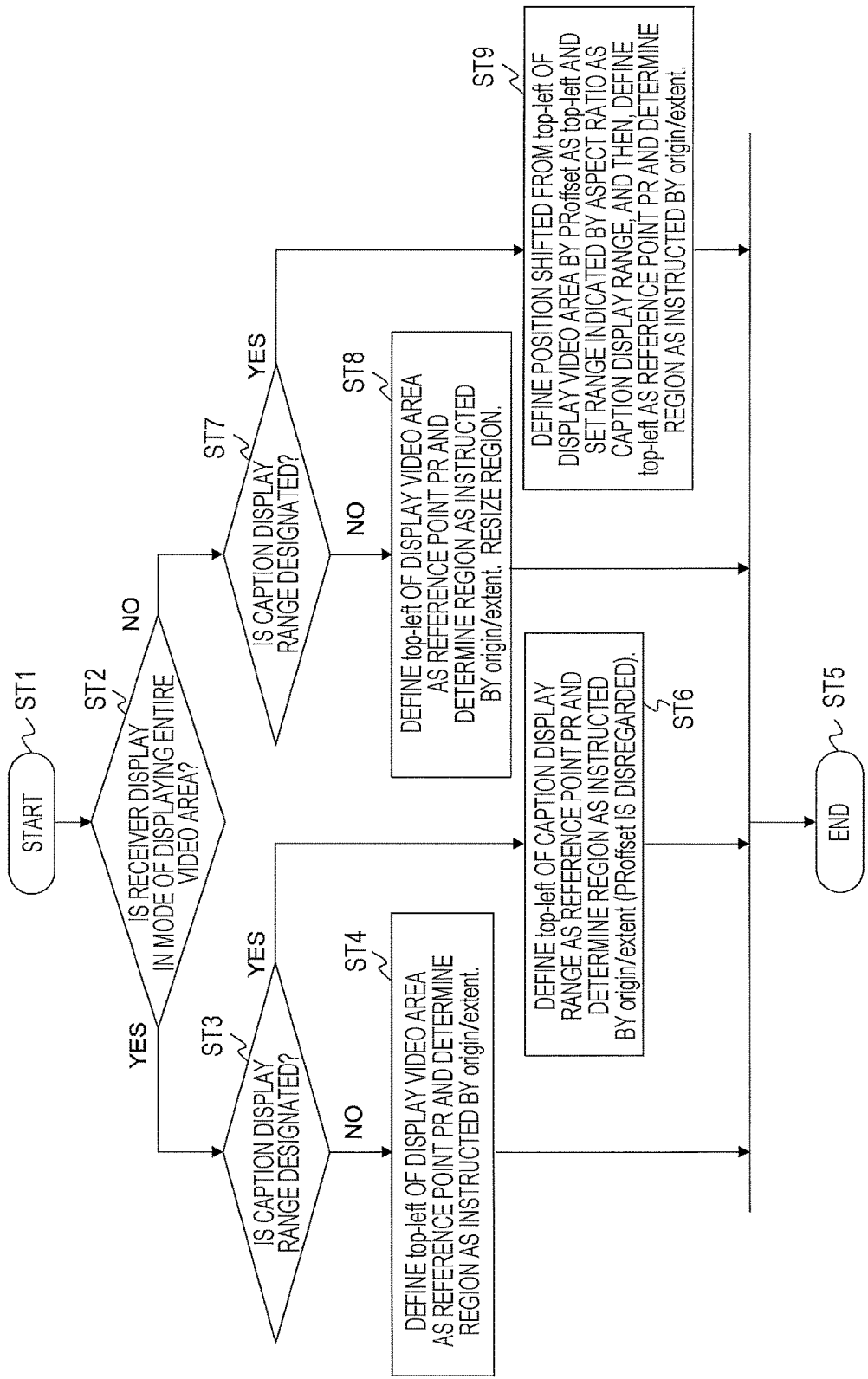
FIG. 15 is a flowchart illustrating an exemplary procedure of determining a caption display position and performing resize processing in a CPU of a television receiver.

The procedure of determination and resize processing on the caption display position in the CPU 221 will be described in detail. The flowchart of FIG. 15 illustrates an exemplary procedure of determination and resize processing on the caption display position in the CPU 221.

Figure 16:
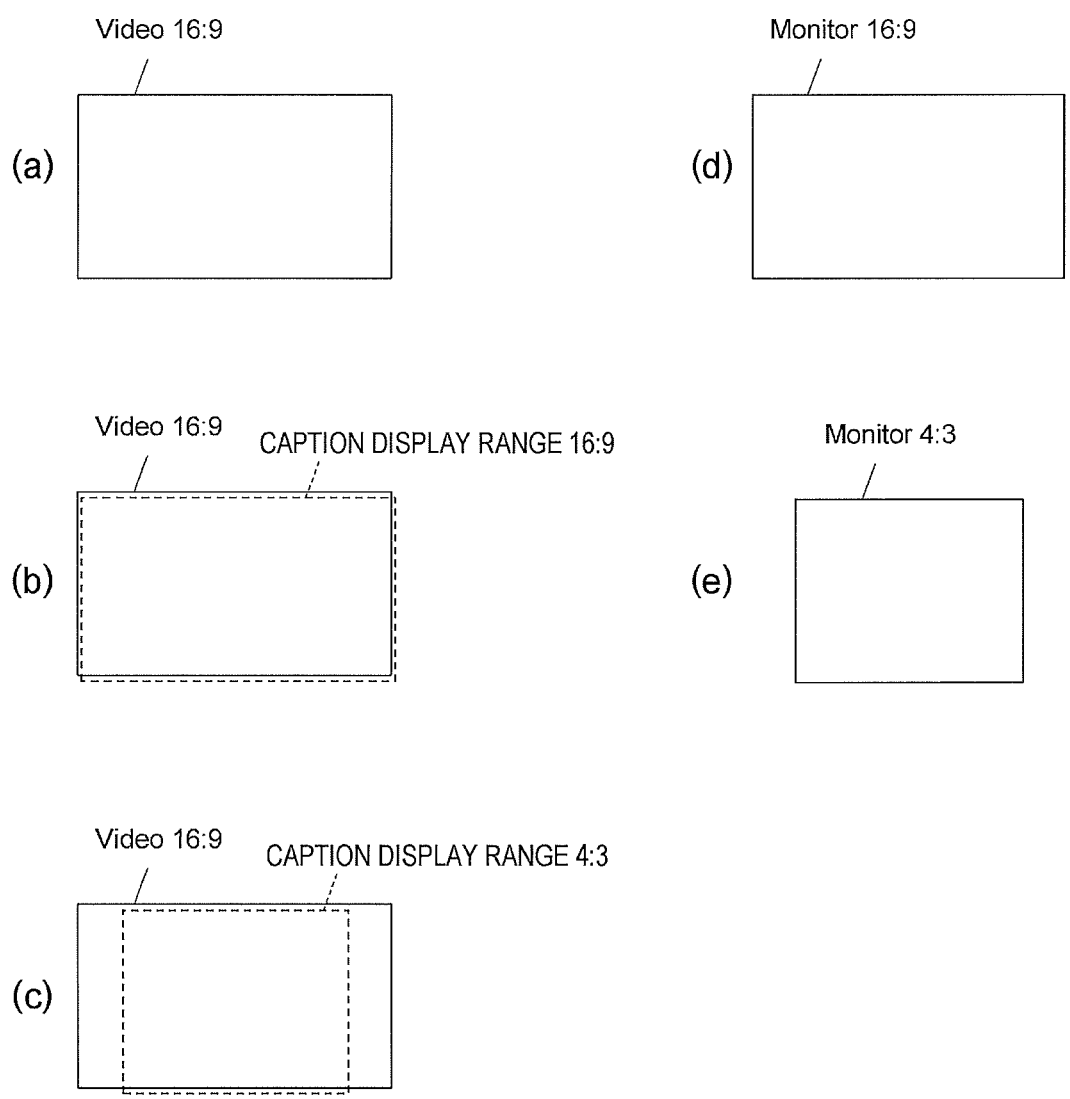
FIG. 16 is a diagram illustrating an example of an aspect ratio of a video area and an aspect ratio of a monitor (display).

In this example, the aspect ratio of the video area is assumed to be 16:9. Then as illustrated in FIG. 16(a), there are two assumed cases, namely, a case where the caption display range is not designated by TTML and a case where the caption display range is designated by TTML as illustrated in FIGS. 16(b) and 16(c). Note that while this is an example in which the aspect ratios of the designated caption display range are 16:9 and 4:3, the aspect ratio of the designated caption display range is not limited to these ratios. In addition, here, there are two assumed cases where the aspect ratio of the monitor (display) is 16:9 and 4:3.

Figure 17:
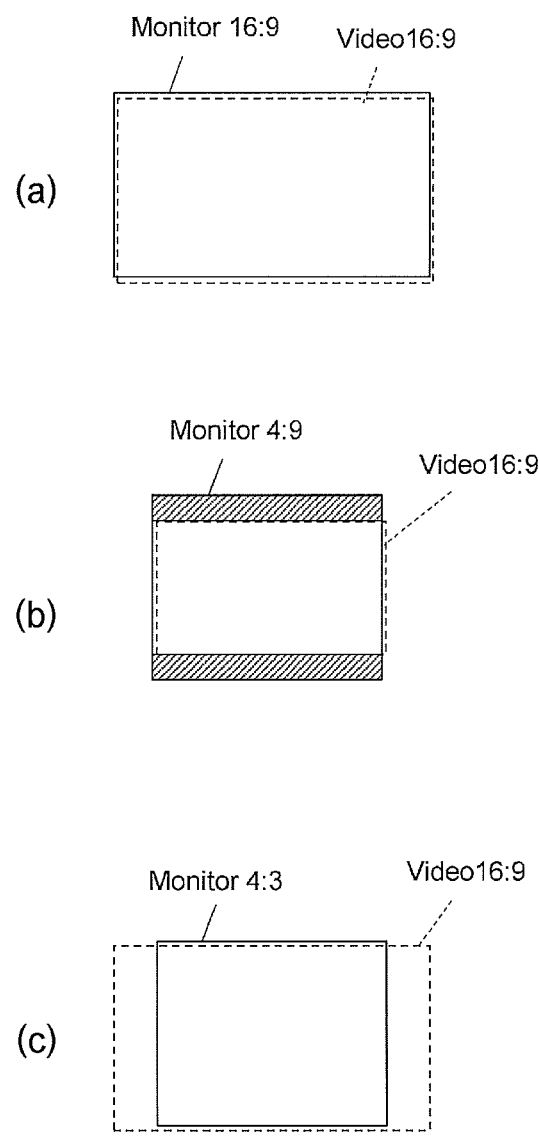
FIG. 17 is a diagram illustrating exemplary determination as to whether the mode is a mode for displaying an entire video area.

The CPU 221 starts processing in step ST1, and then proceeds to processing in step ST2. In this step ST2, the CPU 221 determines whether the receiver display is in a mode of displaying the entire video area. For example, in a case where the aspect ratio of the monitor is 16:9 (refer to FIG. 17(a)) or in a case where the aspect ratio of the monitor is 4:3 and adopts the display method of the letterbox (FIG. 17(b)), it is determined that the mode is a mode of displaying the entire video area. Moreover, for example, in a case where the aspect ratio of the monitor is 4:3 and the center-cut display method is adopted (refer to FIG. 17(c)), it is determined that the mode is a mode of not displaying the entire video area.

When the CPU 221 determines that the mode is the mode of displaying the entire video area, the CPU 221 proceeds to the processing in step ST3. In this step ST3, the CPU 221 determines whether the caption display range is designated. For example, in a case where reference point information (RPoffset) and aspect ratio information (dispasp) of the caption display range exist in the tt root container of TTML, it is determined that the caption display range is designated.

When the caption display range is not designated, the CPU 221 proceeds to the processing of step ST4. In this step ST4, the CPU 221 determines the caption display position (region) with the display video area defined as the caption display range. At this time, the CPU 221 defines the top-left of the display video area as the reference point RP and determines the caption display position (region) in accordance with an instruction of the caption display position information ("origin="OH%OV%"" and "extent="EH%EV%"") designated by the relative position with respect to the caption display range.

FIG. 18(a) illustrates an exemplary case where the monitor has an aspect ratio of 16:9. FIG. 18(b) illustrates an exemplary case where the aspect ratio of the monitor is 4:3 and adopts the display method of letterbox. Note that the sign "RP" indicates a reference point which is the top-left of the caption display range.

After the processing of step ST4, the CPU 221 finishes the processing in step ST5.

When the caption display range is designated in the above-described step ST3, the CPU 221 proceeds to the processing of step ST6. In this step ST6, the CPU 221 determines the caption display position (region) in the designated caption display range. At this time, the CPU 221 uses the aspect ratio information (dispasp) as the information indicating a caption display range, and sets a caption display range in the display video area. Subsequently, the CPU 221 sets the top-left of the caption display range as the reference point RP and determines the caption display position (region) in accordance with the instruction of the caption display position information ("origin="OH%OV%"" and "extent="EH%EV%"") designated by the relative position with respect to the caption display range.

Figure 19:
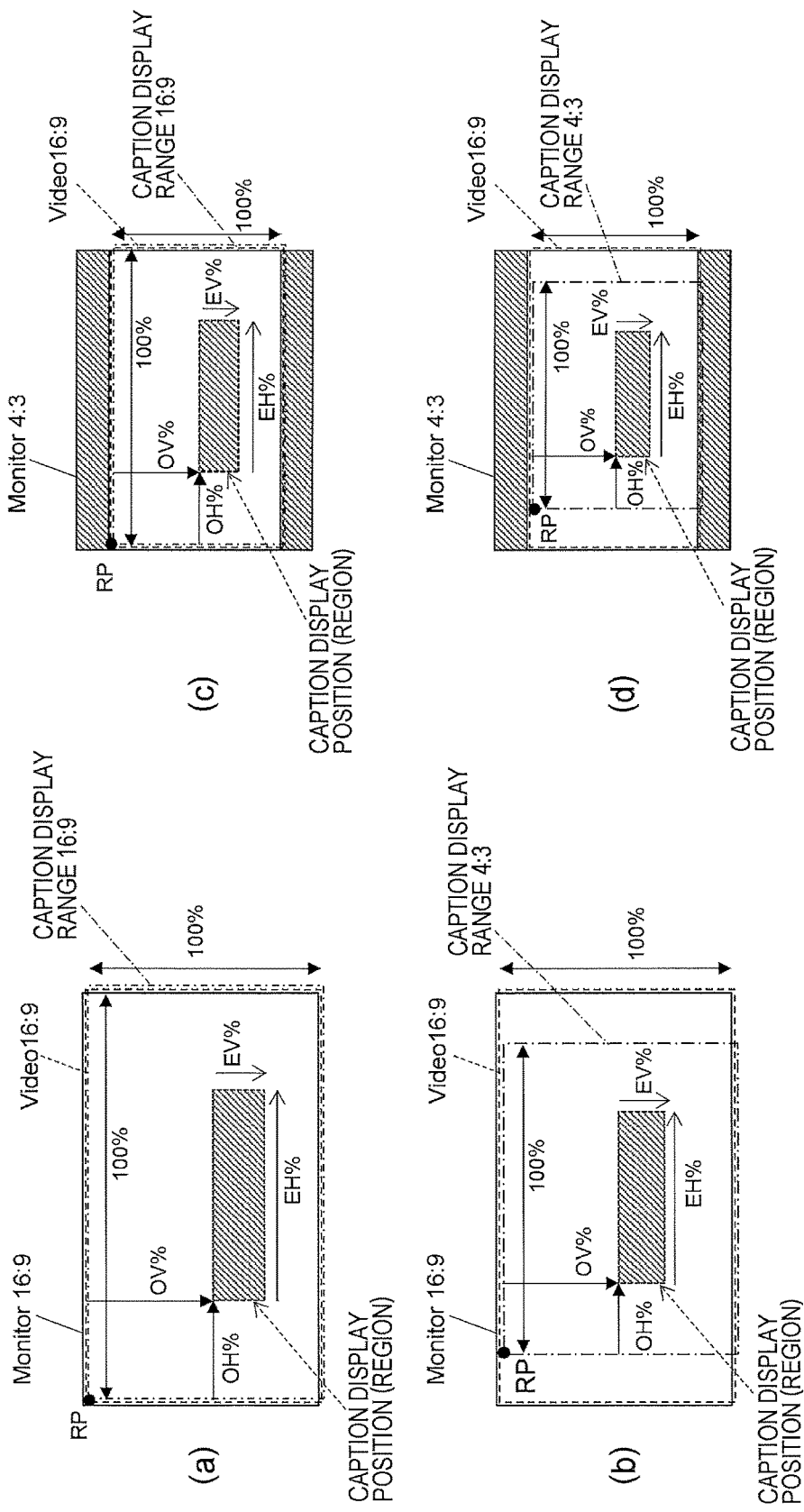
FIG. 19 is a diagram illustrating the determination of the caption display position in the mode of displaying the entire video area and in a case where the caption display range is designated.

FIG. 19(a) illustrates an exemplary case where the aspect ratio of the monitor is 16:9 and the aspect ratio indicated by the aspect ratio information (dispasp) is 16:9. FIG. 19(b) illustrates an exemplary case where the aspect ratio of the monitor is 16:9 and the aspect ratio indicated by the aspect ratio information (dispasp) is 4:3.

Note that in a case where the aspect ratio indicated by the aspect ratio information (dispasp) is different from the aspect ratio of the monitor in this manner, the CPU 221 sets a caption display range having the width in the vertical direction or the width in the horizontal direction matching with each other and having the aspect ratio indicated by the aspect ratio information (dispasp) at the center of the display video area. In the illustrated example, since the aspect ratio of the monitor is 16:9 and the aspect ratio information (dispasp) is 4:3, the width in the vertical direction matches with each other.

FIG. 19(c) illustrates an exemplary case where the aspect ratio of the monitor is 4:3, the letterbox display method is adopted, and the aspect ratio indicated by the aspect ratio information (dispasp) is 16:9. FIG. 19(d) illustrates an exemplary case where the aspect ratio of the monitor is 4:3, the letterbox display method is adopted, and the aspect ratio indicated by the aspect ratio information (dispasp) is 4:3.

After the processing of step ST6, the CPU 221 finishes the processing in step ST5.

When it is determined that the mode is a mode not displaying the entire video area in the above-described step ST2, the processing proceeds to step ST7. In this step ST7, the CPU 221 determines whether the caption display range is designated. For example, in a case where reference point information (RPoffset) and aspect ratio information (dispasp) of the caption display range exist in the tt root container of TTML, it is determined that the caption display range is designated.

When the caption display range is not designated, the CPU 221 proceeds to the processing of step ST8. In this step ST8, the CPU 221 determines the caption display position (region) with the display video area defined as the caption display range. At this time, the CPU 221 defines the top-left of the display video area as the reference point RP and determines the caption display position (region) in accordance with an instruction of the caption display position information ("origin="OH%OV%"" and "extent="EH%EV%"") designated by the relative position with respect to the caption display range.

The caption display position determined in this manner has a compressed width solely in the horizontal direction. Therefore, the CPU 221 further performs resize processing on the determined caption display position, compresses the width also in the vertical direction, so as to obtain a final caption display position. In this case, the CPU 221 compresses the width in the vertical direction in a state where a predetermined line position is fixed on the basis of the information of "dto:scalingjustify=top" included in the TTML, for example.

Figure 20:
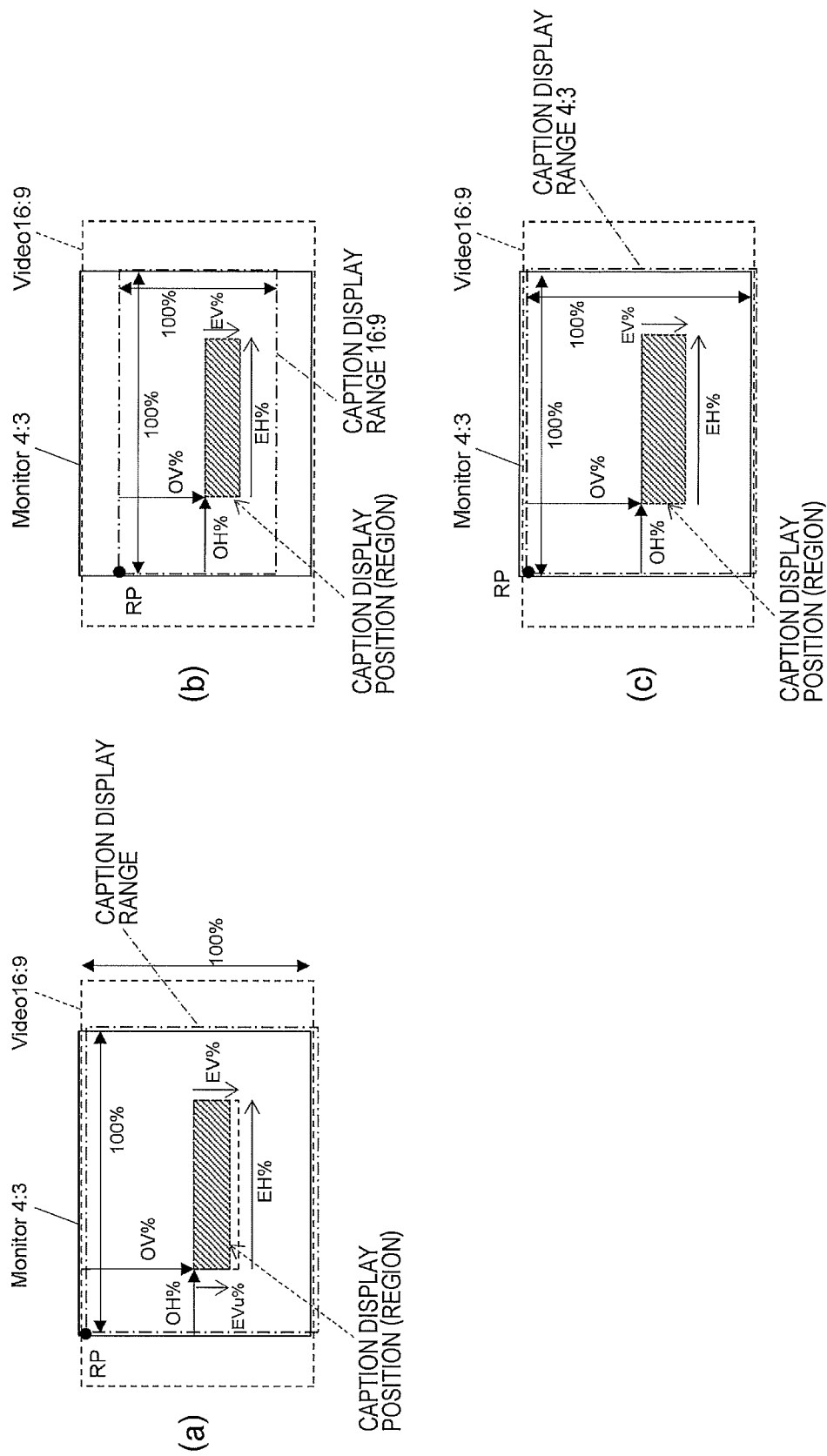
FIG. 20 is a diagram illustrating the determination of the caption display position in the mode not displaying the entire video area and in a case where the caption display range is not designated.

FIG. 20(a) illustrates an exemplary case where the aspect ratio of the monitor is 4:3 and the center-cut display method is adopted. The width of the caption display position in the vertical direction is compressed from EV% to EVu% by resize processing.

After the processing of step ST8, the CPU 221 finishes the processing in step ST5.

When the caption display range is designated in the above-described step ST7, the CPU 221 proceeds to the processing of step ST9. In this step ST9, the CPU 221 determines the caption display position (region) in the designated caption display range. At this time, the CPU 221 uses the information indicating a caption display range (reference point information (RPoffset) and aspect ratio information (dispasp)) so as to set a caption display range on the display video area.

In this case, the CPU 221 sets the position shifted from the top-left of the display video area by the reference point information (RPoffset) as the top-left of the caption display range, and then, sets the range corresponding to the aspect ratio indicated by the aspect ratio information (dispasp). In this case, the horizontal direction width of the caption display range matches the horizontal direction width of the display video area.

Subsequently, the CPU 221 sets the top-left of the caption display range that has been set as above as the reference point RP and determines the caption display position (region) in accordance with the instruction of the caption display position information ("origin="OH%OV%"" and "extent="EH%EV%"") designated by the relative position with respect to the caption display range.

FIG. 20(b) illustrates an exemplary case where the aspect ratio of the monitor is 4:3, the center-cut display method is adopted, and the aspect ratio indicated by the aspect ratio information (dispasp) is 16:9. FIG. 20(c) illustrates an exemplary case where the aspect ratio of the monitor is 4:3, the center-cut display method is adopted, and the aspect ratio indicated by the aspect ratio information (dispasp) is 4:3.

After the processing of step ST9, the CPU 221 ends the processing in step ST5.

As described above, in a case where the aspect ratio of the video area is different from the aspect ratio of the display video area in the transmission-reception system 10 illustrated in FIG. 1, the television receiver 200 either obtains the final caption display position by further performing resize processing on the caption display position determined on the basis of caption display position information with the display video area defined as the caption display range, or sets the caption display range in the display video area and determines the caption display position on the basis of the caption display position information. Therefore, even in a case where the aspect ratio of the video area is different from the aspect ratio of the display video area, the original shape can be maintained as the caption display position, making it possible to perform display of captions satisfactorily without giving the viewer a sense of discomfort.

Moreover, in the transmission-reception system 10 illustrated in FIG. 1, the broadcast delivery system 100 includes, in the TTML as caption information, information related to resize processing to be performed on the receiving side such as information indicating the line position to be a fixed position in a case where the vertical direction size is compressed by the resize processing of the caption display position. Therefore, this enables the receiving side to easily perform the resize processing appropriately on the basis of this information.

Moreover, in the transmission-reception system 10 illustrated in FIG. 1, the broadcast delivery system 100 includes information indicating a caption display range in TTML as caption information. Therefore, with the setting of the caption display range on the basis of the information, it is possible on the receiving side to easily set the caption display range appropriately in the display video area.

2. Modification

Note that the above-described embodiment is an example in which the broadcast delivery system 100 includes the reference point information (RPoffset) and the aspect ratio information (dispasp) as the information indicating a caption display range in the TTML. It is, however, conceivable that the broadcast delivery system 100 includes the reference point information (RPoffset) alone as the information indicating a caption display range, in the TTML. FIG. 21 and FIG. 22 illustrate an example of the TTML structure in this case. While the exemplary TTML structures are not described in detail, the structures are similar to the exemplary TTML structures illustrated in FIGS. 3 and 5 except that there is no aspect ratio information (dispasp) of the caption display range.

Figure 23:
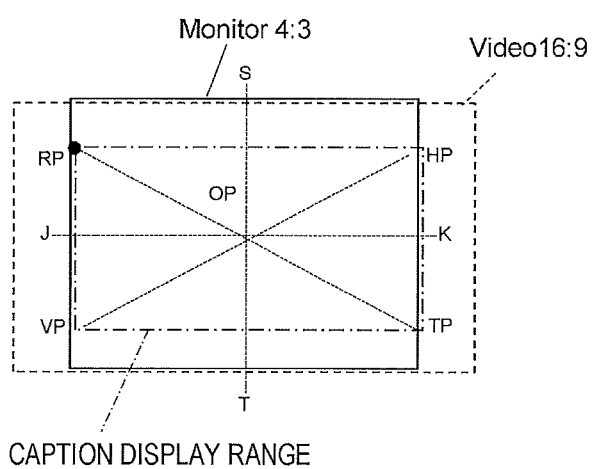
FIG. 23 is a diagram for illustrating how the CPU of the television receiver sets the caption display range in a case where the reference point information (RPoffset) alone is given.

An example of how the CPU 221 of the television receiver 200 sets the caption display range in a case where the reference point information (RPoffset) alone is given will be described with reference to FIG. 23. The illustrated example is a case where the aspect ratio of the video area is 16:9 while the aspect ratio of the display video area is 4:3.

On the basis of the reference point information (RPoffset), the CPU 221 initially sets the position shifted from the top-left of the display video area by the reference point information (RPoffset) as the reference point RP of the caption display range. The center position of the display video area is defined as OP, and the coordinate position point-symmetric with respect to OP of the reference point RP is defined as TP. Moreover, the position line-symmetric with respect to a horizontal line JK passing through the OP of the reference point RP is defined as VP. Moreover, the position line-symmetrical with respect to a vertical line ST passing through the OP of the reference point RP is defined as HP. Then, a rectangular area surrounded by RP-HP-TP-VP is set as the caption display range.

In this manner, in a case where the broadcast delivery system 100 sends solely the reference point information (RPoffset) as the information indicating a caption display range, it is possible to designate caption display range more flexibly compared to the case where both the reference point information (RPoffset) and the aspect ratio information (dispasp) are sent.

Figure 24:
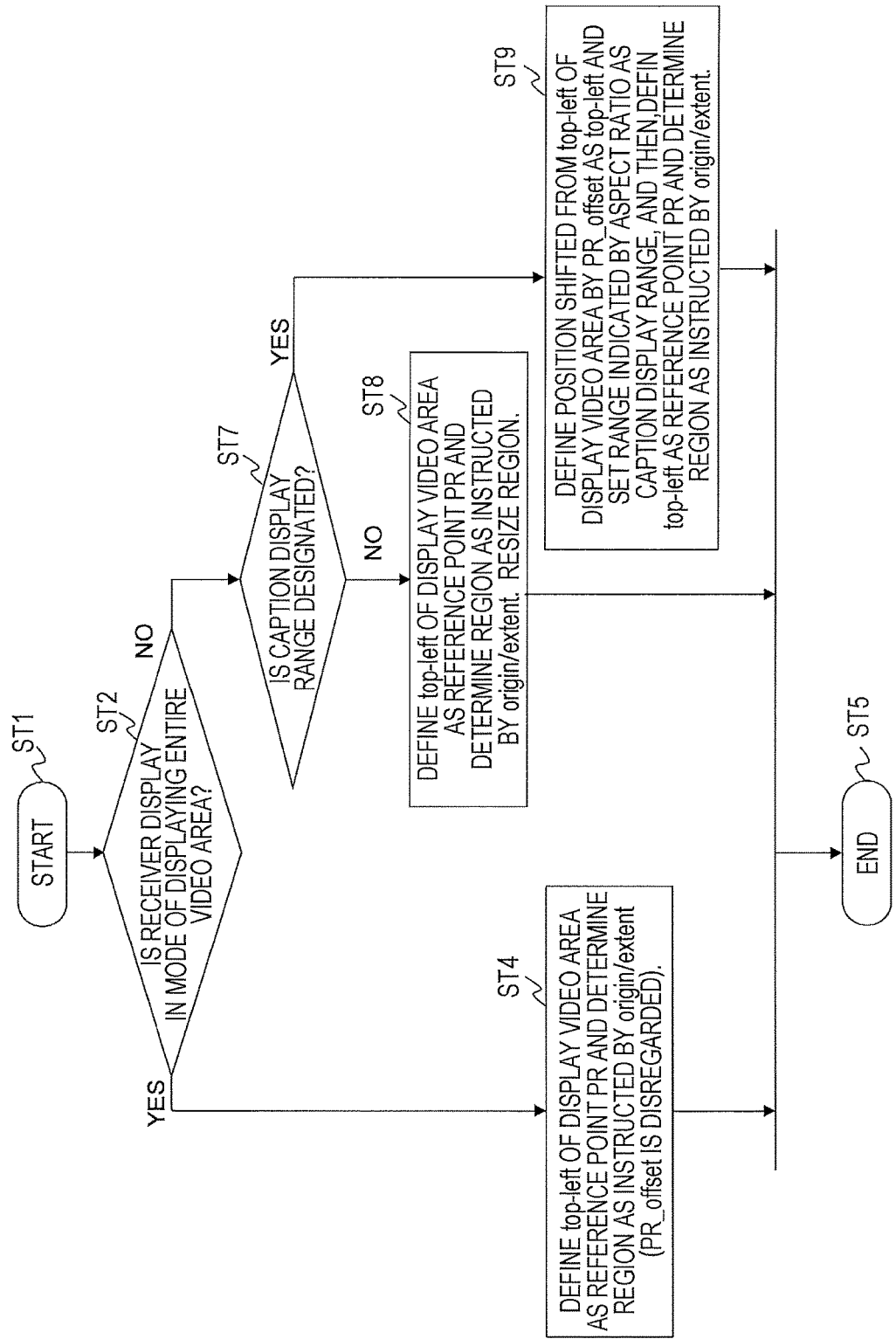
FIG. 24 is a flowchart illustrating another example of a procedure of determining a caption display position and performing resize processing in a CPU of a television receiver.

The flowchart of FIG. 24 illustrates an exemplary procedure of determination and resize processing on the caption display position in the CPU 221 of the television receiver 200 in a case where solely the reference point information (RPoffset) is sent as the information indicating a caption display range. In FIG. 24, portions corresponding to those in FIG. 15 are denoted by the same reference numerals.

When it is determined in step ST2 that the mode is a mode of displaying the entire video area, the CPU 221 determines in step ST4 the caption display position (region) with the display video area defined as the caption display range. At this time, the CPU 221 defines the top-left of the display video area as the reference point RP and determines the caption display position (region) in accordance with an instruction of the caption display position information ("origin="OH%OV%"" and "extent="EH%EV%"") designated by the relative position with respect to the caption display range.

After the processing of step ST4, the CPU 221 finishes the processing in step ST5.

While detailed description is omitted, the other steps of the flowchart of FIG. 24 are similar to the steps of the flowchart of FIG. 15.

Moreover, in the above-described embodiment is an example of using TTML as text information of caption of a predetermined format. The present technology, however, is not limited to this, and it is conceivable to use other text information having information equivalent to TTML. For example, a derived format of TTML may be used.

Moreover, while the above-described embodiment illustrates a case where the transmission-reception system 10 includes the broadcast delivery system 100 and the television receiver 200, the configuration of the transmission-reception system to which the present technology can be applied is not limited to this. For example, it is allowable to have a configuration including a set top box and a monitor being connected with a digital interface such as a high-definition multimedia interface (HDMI) used as the portion of the television receiver 200. Note that "HDMI" is a registered trademark.

Moreover, the above-described embodiment illustrates an example in which the container is a transport stream of MPEG-2 TS. Needless to say, the present technology can be similarly applied to the case where the container is a transport stream of MMT, a DASH/ISOBMFF stream, or the like.

Moreover, the present technology may also be configured as below.

(1) A reception apparatus including:
a reception unit that receives a container of a predetermined format containing a video stream including video data and a subtitle stream including caption information;
a video decoding unit that performs decode processing on the video stream to obtain video data; and
a subtitle decoding unit that performs decode processing on the subtitle stream to obtain bitmap data of a caption;
in which a caption display position is designated by a relative position with respect to a caption display range in caption display position information included in the caption information,
the reception apparatus further including:
a display control unit that, in a case where an aspect ratio of a video area is different from an aspect ratio of the display video area, determines a caption display position on the basis of the caption display position information with a display video area defined as a caption display range, performs resize processing on the determined caption display position, and performs display position control on the bitmap data of the caption on the basis of the caption display position that has undergone the resize processing; and
a video superimposing unit that superimposes the bitmap data of the caption that has undergone the display position control, on the video data.

(2) The reception apparatus according to (1),
in which in a case where the size in the vertical direction is compressed by the resize processing of the caption display position, the display control unit performs compression in a state where a predetermined line position is fixed.

(3) The reception apparatus according to (1) or (2),
in which the caption information contained in the subtitle stream includes information related to the resize processing, and
the display control unit uses the information related to the resize processing to perform the resize processing on the determined caption display position.

(4) A reception method including:
a reception step, executed by a reception unit, of receiving a container of a predetermined format containing a video stream including video data and a subtitle stream including caption information;
a video decoding step of performing decode processing on the video stream to obtain video data; and
a subtitle decoding step of performing decode processing on the subtitle stream to obtain bitmap data of a caption;

in which a caption display position is designated by a relative position with respect to a caption display range in caption display position information included in the caption information, the reception method further including:

a display control step, performed in a case where an aspect ratio of a video area is different from an aspect ratio of the display video area, of determining a caption display position on the basis of the caption display position information with a display video area defined as a caption display range, performing resize processing on the determined caption display position, and performing display position control on the bitmap data of the caption on the basis of the caption display position that has undergone the resize processing; and a video superimposing step of superimposing the bitmap data of the caption that has undergone the display position control, on the video data.

(5) A reception apparatus including:

a reception unit that receives a container of a predetermined format containing a video stream including video data and a subtitle stream including caption information;

a video decoding unit that performs decode processing on the video stream to obtain video data; and a subtitle decoding unit that performs decode processing on the subtitle stream to obtain bitmap data of a caption;

in which a caption display position is designated by a relative position with respect to a caption display range in caption display position information included in the caption information, the reception apparatus further including:

a display control unit that, in a case where an aspect ratio of a video area is different from an aspect ratio of the display video area, sets a caption display range in the display video area, determines a caption display position on the basis of the caption display position information, and performs display position control on the bitmap data of the caption on the basis of the determined caption display position; and a video superimposing unit that superimposes the bitmap data of the caption that has undergone the display position control, on the video data.

(6) The reception apparatus according to (5), in which the caption information contained in the subtitle stream includes information indicating the caption display range, and the display control unit sets a caption display range in the display video area using the information indicating the caption display range.

(7) The reception apparatus according to (6), in which the information indicating the caption display range is reference point information and aspect ratio information of the caption display range, or reference point information of the caption display range.

(8) A reception method including:

a reception step, executed by a reception unit, of receiving a container of a predetermined format containing a video stream including video data and a subtitle stream including caption information;

a video decoding step of performing decode processing on the video stream to obtain video data; and a subtitle decoding step of performing decode processing on the subtitle stream to obtain bitmap data of a caption;

in which a caption display position is designated by a relative position with respect to a caption display range in caption display position information included in the caption information, the reception method further including:

a display control step, performed in a case where an aspect ratio of a video area is different from an aspect ratio of the display video area, of setting a caption display range in the display video area, determining a caption display position on the basis of the caption display position information, and performing display position control on the bitmap data of the caption on the basis of the determined caption display position; and a video superimposing step of superimposing the bitmap data of the caption that has undergone the display position control, on the video data.

(9) A transmission apparatus including a transmission unit that transmits a container of a predetermined format containing a video stream including video data and a subtitle stream including caption information, in which the caption display position in the caption display position information included in the caption information is designated by a relative position with respect to the caption display range, and the caption information includes information related to resize processing on the caption display position determined on the basis of the caption display position information, performed on a receiving side in a case where the aspect ratio of the video area is different from the aspect ratio of the display video area.

(10) The transmission apparatus according to (9), in which the information related to the resize processing is information indicating a line position to be set as a fixed position in a case where the size in the vertical direction is compressed in the resize processing of the caption display position.

(11) A transmission apparatus including a transmission unit that transmits a container of a predetermined format containing a video stream including video data and a subtitle stream including caption information, in which the caption display position in the caption display position information included in the caption information is designated by a relative position with respect to a caption display range, and the caption information includes information indicating the caption display range.

(12) The transmission apparatus according to (11), in which the information indicating the caption display range is reference point information and aspect ratio information of the caption display range, or reference point information of the caption display range.

Main features of the present technology include capability, in a case where the aspect ratio of the video area is different from the aspect ratio of the display video area, of obtaining a final caption display position by further performing resize processing on a caption display position determined on the basis of caption display position information with the display video area defined as the caption display range, or setting the caption display range in the display video area and determining the caption display position on the basis of the caption display position information. With this configuration, it is possible to maintain an original shape as the caption display position in a case where the aspect ratio of the video area is different from the aspect ratio of the display video area, enabling display of captions satisfactorily without giving a viewer a sense of discomfort (refer to FIG. 20).

REFERENCE SIGNS LIST

10 Transmission-reception system
100 Broadcast delivery system

110 Stream generation unit
111 Control unit
112 Video encoder
113 Audio encoder
114 Text format converter
115 Subtitle encoder
116 TS formatter
200 Television receiver
201 Reception unit
202 TS analysis unit
203 Video decoder
204 Video superimposing unit
205 Panel drive circuit
206 Display panel
207 Audio decoder
208 Audio output circuit
209 Speaker
210 Subtitle decoder
221 CPU

The invention claimed is:

1. A reception apparatus, comprising:
processing circuitry configured to
receive a container containing a video stream including video data and a subtitle stream, the subtitle stream including caption display position information that designates a caption display position by a relative position with respect to a reference point of a display video area,
decode the subtitle stream to obtain caption bitmap data,
determine a caption display area on a basis of the caption display position,
resize the determined caption display area by adjusting a width in a vertical direction and a width in a horizontal direction of the determined caption display area based on an aspect ratio of the display video area when an aspect ratio of a video area is different from the aspect ratio of the display video area, and
superimpose the caption bitmap data on the video data based on the resized caption display area.

2. The reception apparatus according to claim 1, wherein the caption display position information includes another caption display position and the processing circuitry is further configured to determine another caption display area based on the other caption display position.

3. The reception apparatus according to claim 2, wherein a distance between the caption display area and the other caption display area is not changed when the aspect ratio of the video area is different from the aspect ratio of the display video area.

4. The reception apparatus according to claim 1, wherein the caption bitmap data includes texts and the processing circuitry is further configured to adjust a size or font of the texts based on the resized caption display area.

5. The reception apparatus according to claim 1, wherein when the width in the vertical direction is not adjusted, the processing circuitry is further configured to compress the width in the horizontal direction of the determined caption display area based on the aspect ratio of the display video area.

6. The reception apparatus according to claim 1, wherein when the width in the horizontal direction is not adjusted, the processing circuitry is further configured to compress the width in the vertical direction of the determined caption display area based on the aspect ratio of the display video area.

7. A reception method, comprising:
receiving a container containing a video stream including video data and a subtitle stream, the subtitle stream including caption display position information that designates a caption display position by a relative position with respect to a reference point of a display video area;
decoding the subtitle stream to obtain caption bitmap data;
determining a caption display area on a basis of the caption display position;
resizing the determined caption display area by adjusting a width in a vertical direction and a width in a horizontal direction of the determined caption display area based on an aspect ratio of the display video area when an aspect ratio of a video area is different from the aspect ratio of the display video area; and superimposing the caption bitmap data on the video data based on the resized caption display area.

8. The reception method according to claim 7, wherein the caption display position information includes another caption display position and the method further comprises:
determining another caption display area based on the other caption display position.

9. The reception method according to claim 7, wherein a distance between the caption display area and the other caption display area is not changed when the aspect ratio of the video area is different from the aspect ratio of the display video area.

10. The reception method according to claim 7, wherein the caption bitmap data includes texts and the method further comprises:
adjusting a size or font of the texts based on the resized caption display area.

11. The reception method according to claim 7, wherein when the width in the vertical direction is not adjusted, the method further comprises:
compressing the width in the horizontal direction of the determined caption display area based on the aspect ratio of the display video area.

12. The reception method according to claim 7, wherein when the width in the horizontal direction is not adjusted, the method further comprises:
compressing the width in the vertical direction of the determined caption display area based on the aspect ratio of the display video area.

13. A reception apparatus, comprising:
processing circuitry configured to
receive a container containing a video stream including video data and a subtitle stream, the subtitle stream including caption display position information that designates a caption display position by a relative position with respect to a reference point of a caption display range,
decode the subtitle stream to obtain caption bitmap data,
when an aspect ratio of a video area is different from an aspect ratio of a display video area, set the caption display range in the display video area, the set caption display range having a same aspect ratio of the aspect ratio of the display video area,
determine a caption display area in the set caption display range on a basis of the caption display position, and
superimpose the caption bitmap data on the video data based on the caption display area.

14. A reception method, comprising:
receiving a container containing a video stream including video data and a subtitle stream, the subtitle stream including caption display position information that designates a caption display position by a relative position with respect to a reference point of a caption display range;

decoding the subtitle stream to obtain caption bitmap data;

when an aspect ratio of a video area is different from an aspect ratio of a display video area, setting the caption display range in the display video area, the set caption display range having a same aspect ratio of the aspect ratio of the display video area, determining a caption display area in the set caption display range on a basis of the caption display position; and superimposing the caption bitmap data on the video data based on the caption display area.

* * * * *